(12) United States Patent
Foody

(10) Patent No.: US 12,692,152 B2
(45) Date of Patent: *Jul. 28, 2026

(54) METHOD FOR MAKING LOW CARBON INTENSITY HYDROGEN

(71) Applicant: Iogen Corporation, Ottawa (CA)

(72) Inventor: Brian Foody, Ottawa (CA)

(73) Assignee: Iogen Corporation, Ottawa (CA)

( * ) Notice: Subject to any disclaimer, the term of this patent is extended or adjusted under 35 U.S.C. 154(b) by 472 days.

This patent is subject to a terminal disclaimer.

(21) Appl. No.: 18/480,174

(22) Filed: Oct. 3, 2023

(65) Prior Publication Data

US 2024/0025737 A1 Jan. 25, 2024

Related U.S. Application Data

(63) Continuation of application No. 18/162,950, filed on Feb. 1, 2023, now Pat. No. 11,807,530.

(60) Provisional application No. 63/362,788, filed on Apr. 11, 2022.

(51) Int. Cl.
*C01B 3/26* (2006.01)

(52) U.S. Cl.
CPC ........ *C01B 3/26* (2013.01); *C01B 2203/0233* (2013.01); *C01B 2203/0475* (2013.01); *C01B 2203/1241* (2013.01); *C01B 2203/86* (2013.01)

(58) Field of Classification Search
None
See application file for complete search history.

(56) References Cited

U.S. PATENT DOCUMENTS

| | | | |
|---|---|---|---|
| 3,105,811 | A | 10/1963 | Engel |
| 4,289,625 | A | 9/1981 | Tarman et al. |
| 4,372,856 | A | 2/1983 | Morrison |

(Continued)

FOREIGN PATENT DOCUMENTS

| | | |
|---|---|---|
| AU | 2020100873 A4 | 7/2020 |
| AU | 2021102128 A4 | 9/2021 |

(Continued)

OTHER PUBLICATIONS

International Search Report and Written Opinion issued in PCT Application No. PCT/CA2022/051769, dated Mar. 6, 2023.

(Continued)

*Primary Examiner* — Yun Qian
(74) *Attorney, Agent, or Firm* — Knobbe, Martens, Olson & Bear, LLP

(57) ABSTRACT

The present disclosure provides a method for reducing the carbon intensity of hydrogen by replacing, at a hydrogen production facility, a fraction of a non-renewable gaseous feedstock with a biomethane feedstock, wherein the non-renewable gaseous feedstock replaced is (a) a feedstock fed to methane reforming and/or (b) a feedstock used to generate heat for the reforming in the hydrogen production, and wherein the fraction of the non-renewable gaseous feedstock replaced by the biomethane feedstock is less than 50% and is at least r defined by Equation A herein. The disclosed process for reducing the carbon intensity of hydrogen is designed to reduce greenhouse gas (GHG) emissions and mitigate climate change. The biomethane feedstock in some examples has a carbon intensity (CI) value within a range that is between 15 g $CO_2$eq/MJ and −500 g $CO_2$eq/MJ.

19 Claims, 7 Drawing Sheets

(56) References Cited

U.S. PATENT DOCUMENTS

| | | |
|---|---|---|
| 6,503,298 B1 | 1/2003 | Monzyk et al. |
| 7,014,768 B2 | 3/2006 | Li et al. |
| 7,332,146 B1 | 2/2008 | Huang et al. |
| RE40,419 E | 7/2008 | Norbeck et al. |
| 7,691,182 B1 | 4/2010 | Muradov et al. |
| 7,753,972 B2 | 7/2010 | Zubrin et al. |
| 7,794,690 B2 | 9/2010 | Abatzoglou et al. |
| 7,931,888 B2 | 4/2011 | Drnevich et al. |
| 7,937,948 B2 | 5/2011 | Zubrin et al. |
| 7,951,296 B2 | 5/2011 | Williams |
| 7,972,082 B2 | 7/2011 | Augenstein et al. |
| 8,021,464 B2 | 9/2011 | Gauthier et al. |
| 8,057,773 B2 | 11/2011 | MacArthur et al. |
| 8,137,422 B2 | 3/2012 | Licht et al. |
| 8,198,058 B2 | 6/2012 | Offerman |
| 8,268,044 B2 | 9/2012 | Wright et al. |
| 8,318,130 B2 | 11/2012 | Grimes et al. |
| 8,460,630 B2 | 6/2013 | Niitsuma et al. |
| 8,470,567 B2 | 6/2013 | Facey et al. |
| 8,475,566 B2 | 7/2013 | Find |
| 8,496,908 B1 | 7/2013 | Genkin et al. |
| 8,629,188 B2 | 1/2014 | Ravikumar et al. |
| 8,658,026 B2 | 2/2014 | Foody et al. |
| 8,673,056 B2 | 3/2014 | De Bas et al. |
| 8,673,135 B2 | 3/2014 | Colyar et al. |
| 8,679,439 B2 | 3/2014 | Randhava et al. |
| 8,753,854 B2 | 6/2014 | Foody |
| 8,809,603 B2 | 8/2014 | Corradini et al. |
| 8,852,456 B2 | 10/2014 | Valentin et al. |
| 8,900,546 B2 | 12/2014 | Van De Graaf et al. |
| 8,916,735 B2 | 12/2014 | McAlister |
| 8,945,373 B2 | 2/2015 | Foody |
| 8,974,669 B2 | 3/2015 | Del Porto |
| 8,980,211 B2 | 3/2015 | Timmins |
| 8,987,175 B2 | 3/2015 | Van Den Berg et al. |
| 9,028,794 B2 | 5/2015 | Darde et al. |
| 9,038,435 B2 | 5/2015 | Wang |
| 9,040,271 B2 | 5/2015 | Foody |
| 9,045,337 B2 | 6/2015 | Kuku |
| 9,062,257 B1 | 6/2015 | Agee et al. |
| 9,108,894 B1 | 8/2015 | Foody et al. |
| 9,163,180 B2 | 10/2015 | Marion et al. |
| 9,163,188 B2 | 10/2015 | Forsyth et al. |
| 9,381,493 B2 | 7/2016 | Kirk et al. |
| 9,476,066 B2 | 10/2016 | Foody |
| 9,506,605 B2 | 11/2016 | Paget et al. |
| 9,701,535 B2 | 7/2017 | Iaquaniello et al. |
| 9,790,115 B2 | 10/2017 | Garcia-Perez et al. |
| 9,816,035 B2 | 11/2017 | Lehoux et al. |
| 9,963,665 B2 | 5/2018 | Feldmann |
| 10,093,540 B2 | 10/2018 | Foody |
| 10,106,746 B2 | 10/2018 | Boon et al. |
| 10,228,131 B2 | 3/2019 | Merritt, Jr. |
| 10,302,357 B2 | 5/2019 | Hernandez et al. |
| 10,414,649 B2 | 9/2019 | Denton et al. |
| 10,421,663 B2 | 9/2019 | Foody |
| 10,557,338 B2 | 2/2020 | Rhodes et al. |
| 10,577,248 B2 | 3/2020 | Haper, Jr. |
| 10,627,158 B2 | 4/2020 | Repasky et al. |
| 10,640,793 B2 | 5/2020 | Foody et al. |
| 10,723,621 B2 | 7/2020 | Foody |
| 10,760,024 B2 | 9/2020 | Foody et al. |
| 10,894,968 B2 | 1/2021 | Foody et al. |
| 10,927,008 B2 | 2/2021 | Raaheim et al. |
| 10,981,784 B2 | 4/2021 | Foody |
| 11,168,339 B1 | 11/2021 | Stepany et al. |
| 11,204,271 B2 | 12/2021 | Williams et al. |
| 11,293,035 B2 | 4/2022 | Ludtke et al. |
| 11,299,686 B2 | 4/2022 | Foody et al. |
| 11,402,068 B2 | 8/2022 | Himschoot et al. |
| 11,434,509 B2 | 9/2022 | Foody et al. |
| 11,760,630 B2 | 9/2023 | Foody |
| 11,807,530 B2 | 11/2023 | Foody |
| 11,827,916 B2 | 11/2023 | Foody et al. |
| 11,946,001 B2 | 4/2024 | Foody |
| 11,946,006 B2 | 4/2024 | Foody et al. |
| 11,952,272 B1 | 4/2024 | Best, III et al. |
| 11,952,274 B1 | 4/2024 | Best, III et al. |
| 11,952,276 B1 | 4/2024 | Best, III et al. |
| 12,017,913 B1 | 6/2024 | Miller et al. |
| 12,241,036 B2 | 3/2025 | Foody et al. |
| 12,264,068 B2 | 4/2025 | Foody |
| 12,312,547 B2 | 5/2025 | Foody et al. |
| 12,338,406 B2 | 6/2025 | Foody et al. |
| 12,359,134 B2 | 7/2025 | Foody |
| 2003/0111410 A1 | 6/2003 | Branson |
| 2004/0111968 A1 | 6/2004 | Day et al. |
| 2006/0207178 A1 | 9/2006 | Hsu |
| 2007/0062216 A1 | 3/2007 | Mak et al. |
| 2007/0295593 A1 | 12/2007 | Martinez |
| 2008/0159938 A1 | 7/2008 | Mauthner et al. |
| 2008/0262701 A1 | 10/2008 | Williams et al. |
| 2008/0280338 A1 | 11/2008 | Hall et al. |
| 2009/0162914 A1 | 6/2009 | Offerman et al. |
| 2009/0255181 A1 | 10/2009 | Rhinesmith et al. |
| 2010/0015680 A1 | 1/2010 | Van Groenestijn et al. |
| 2010/0047160 A1 | 2/2010 | Allam |
| 2010/0071429 A1 | 3/2010 | Von Nordenskjold |
| 2010/0076238 A1 | 3/2010 | Brandvold et al. |
| 2010/0158792 A1 | 6/2010 | Drnevich et al. |
| 2010/0205863 A1 | 8/2010 | Biollaz et al. |
| 2010/0228067 A1 | 9/2010 | Peterson et al. |
| 2010/0297749 A1 | 11/2010 | Aravanis et al. |
| 2011/0020862 A1 | 1/2011 | Audebert et al. |
| 2011/0113779 A1 | 5/2011 | Polvi |
| 2011/0158858 A1 | 6/2011 | Alves Ramalho Gomes |
| 2011/0175032 A1 | 7/2011 | Gunther |
| 2011/0226997 A1 | 9/2011 | Goruney et al. |
| 2011/0229404 A1 | 9/2011 | Guo et al. |
| 2011/0305627 A1 | 12/2011 | Gupta et al. |
| 2012/0058045 A1 | 3/2012 | Beckman et al. |
| 2012/0165581 A1 | 6/2012 | Dupassieux et al. |
| 2012/0232173 A1 | 9/2012 | Juranitch et al. |
| 2012/0270119 A1 | 10/2012 | Raaheim et al. |
| 2012/0291351 A1 | 11/2012 | Bool et al. |
| 2013/0023707 A1 | 1/2013 | Keefer et al. |
| 2013/0097929 A1 | 4/2013 | Pham et al. |
| 2013/0161235 A1 | 6/2013 | Foody |
| 2013/0164806 A1 | 6/2013 | Foody |
| 2013/0345325 A1 | 12/2013 | Lecomte et al. |
| 2014/0023975 A1 | 1/2014 | Paul et al. |
| 2014/0186258 A1 | 7/2014 | Allidieres |
| 2014/0360485 A1 | 12/2014 | Saxena |
| 2015/0038599 A1 | 2/2015 | Kresnyak |
| 2015/0118723 A1 | 4/2015 | Duzoglou |
| 2015/0133701 A1 | 5/2015 | Townsend et al. |
| 2015/0225233 A1 | 8/2015 | Foody |
| 2015/0376801 A1 | 12/2015 | Bairamijamal |
| 2016/0060537 A1 | 3/2016 | Hsu |
| 2016/0264418 A1 | 9/2016 | Leclerc et al. |
| 2017/0001142 A1 | 1/2017 | Rayner et al. |
| 2017/0022424 A1 | 1/2017 | Chapus |
| 2017/0051318 A1 | 2/2017 | Hakalehto |
| 2017/0073227 A1 | 3/2017 | Dybkjaer et al. |
| 2017/0130582 A1 | 5/2017 | Hsu |
| 2017/0152453 A1 | 6/2017 | Goerz |
| 2017/0158503 A1 | 6/2017 | Foody et al. |
| 2018/0079672 A1 | 3/2018 | Meyer et al. |
| 2018/0251694 A1 | 9/2018 | Foody et al. |
| 2018/0291278 A1 | 10/2018 | Jack et al. |
| 2019/0352177 A1 | 11/2019 | Denton et al. |
| 2019/0359894 A1 | 11/2019 | Heidel et al. |
| 2020/0078728 A1 | 3/2020 | Iaquaniello et al. |
| 2020/0087576 A1 | 3/2020 | Marker et al. |
| 2020/0096254 A1 | 3/2020 | Cardon et al. |
| 2020/0115664 A1 | 4/2020 | Camacho et al. |
| 2020/0148964 A1 | 5/2020 | Foody et al. |
| 2020/0222874 A1 | 7/2020 | Manenti |
| 2020/0283920 A1 | 9/2020 | Bairamijamal |
| 2020/0307997 A1 | 10/2020 | Tranier |
| 2021/0078888 A1 | 3/2021 | Kanu |
| 2021/0140054 A1 | 5/2021 | Park et al. |
| 2021/0155864 A1 | 5/2021 | Foody et al. |
| 2021/0221679 A1 | 7/2021 | Foody |

(56) References Cited

U.S. PATENT DOCUMENTS

| | | |
|---|---|---|
| 2021/0275961 A1 | 9/2021 | Foody et al. |
| 2021/0285017 A1 | 9/2021 | Feldmann et al. |
| 2021/0317377 A1 | 10/2021 | Foody et al. |
| 2021/0324282 A1 | 10/2021 | Foody et al. |
| 2022/0042406 A1 | 2/2022 | Whikehart et al. |
| 2022/0119255 A1 | 4/2022 | Mortensen |
| 2022/0119269 A1 | 4/2022 | Huckman et al. |
| 2022/0127211 A1 | 4/2022 | Whitmore |
| 2022/0134298 A1 | 5/2022 | Marker et al. |
| 2022/0177792 A1 | 6/2022 | Foody et al. |
| 2022/0213511 A1 | 7/2022 | Mann et al. |
| 2022/0267147 A1 | 8/2022 | Ravikumar et al. |
| 2022/0306559 A1 | 9/2022 | Mortensen et al. |
| 2022/0411264 A1 | 12/2022 | Do et al. |
| 2023/0053930 A1 | 2/2023 | Foody et al. |
| 2023/0271866 A1 | 8/2023 | Sallustro |
| 2023/0295523 A1 | 9/2023 | Foody |
| 2023/0374394 A1 | 11/2023 | Foody |
| 2024/0025739 A1 | 1/2024 | Foody |
| 2024/0117285 A1 | 4/2024 | Kulkarni et al. |
| 2024/0209272 A1 | 6/2024 | Foody et al. |
| 2024/0263081 A1 | 8/2024 | Foody et al. |
| 2024/0270618 A1 | 8/2024 | Huang et al. |
| 2024/0336478 A1 | 10/2024 | Foody |
| 2024/0343567 A1 | 10/2024 | Iaquaniello et al. |
| 2024/0359154 A1 | 10/2024 | Schroer et al. |
| 2025/0101352 A1 | 3/2025 | Carlson et al. |

FOREIGN PATENT DOCUMENTS

| | | | |
|---|---|---|---|
| CA | 2739420 A1 | 9/2011 | |
| CA | 3039567 A1 | 4/2018 | |
| CN | 110776941 A | 2/2020 | |
| CN | 113353886 A | 9/2021 | |
| DE | 10 2013 011 289 | 1/2015 | |
| DE | 1020013011289 A1 | 1/2015 | |
| EP | 2386621 A2 | 11/2011 | |
| EP | 2616530 A2 | 4/2012 | |
| EP | 2724081 A2 | 12/2012 | |
| EP | 2944606 A1 | 11/2015 | |
| EP | 3085766 A1 | 10/2016 | |
| EP | 2547619 B1 | 10/2017 | |
| EP | 3484811 A1 | 1/2018 | |
| EP | 3 795 537 | 3/2021 | |
| EP | 4043089 A1 | 8/2022 | |
| ES | 2490066 A1 | 9/2014 | |
| FR | 2978961 | 2/2013 | |
| GB | 2466554 B | 6/2010 | |
| GB | 2585987 B | 10/2021 | |
| GB | 2589198 B | 11/2021 | |
| GB | 2592531 B | 4/2022 | |
| GB | 2596675 A | 5/2022 | |
| RU | 2711634 | 1/2020 | |
| WO | WO 2003/051803 A1 | 6/2003 | |
| WO | WO 2008/044929 A1 | 4/2008 | |
| WO | WO 2008/109122 A1 | 9/2008 | |
| WO | WO 2009/126379 A1 | 10/2009 | |
| WO | WO 2010/047815 A2 | 4/2010 | |
| WO | WO2010/051622 A1 | 5/2010 | |
| WO | WO 2010/080407 A2 | 7/2010 | |
| WO | WO 2010/124030 A1 | 10/2010 | |
| WO | WO 2011/092136 A1 | 8/2011 | |
| WO | WO2011/101137 A8 | 8/2011 | |
| WO | WO 2012/093041 A1 | 7/2012 | |
| WO | WO 2012/151545 A2 | 11/2012 | |
| WO | WO2013/029171 A1 | 3/2013 | |
| WO | WO2013/131916 A1 | 9/2013 | |
| WO | WO2014/014803 A1 | 1/2014 | |
| WO | WO 2014/091098 A1 | 6/2014 | |
| WO | WO2015/010201 A1 | 1/2015 | |
| WO | WO 2015/042315 | 3/2015 | |
| WO | WO2016/101076 A1 | 6/2016 | |
| WO | WO 2018/187716 A1 | 10/2018 | |
| WO | WO 2019/129858 A1 | 7/2019 | |
| WO | WO2019/185315 A1 | 10/2019 | |
| WO | WO 2019/229798 | 12/2019 | |
| WO | WO2020/010430 A1 | 1/2020 | |
| WO | WO2021/003564 A1 | 1/2021 | |
| WO | WO2021/035352 A1 | 3/2021 | |
| WO | WO2021/035353 A1 | 3/2021 | |
| WO | WO2021/062397 A1 | 4/2021 | |
| WO | WO2021/110757 A1 | 6/2021 | |
| WO | WO 2021/110810 | 6/2021 | |
| WO | WO 2021/110811 | 6/2021 | |
| WO | WO2021/142528 A1 | 7/2021 | |
| WO | WO2021/175662 A1 | 9/2021 | |
| WO | WO 2021/180805 A1 | 9/2021 | |
| WO | WO2021/189137 A1 | 9/2021 | |
| WO | WO2021/203176 A1 | 10/2021 | |
| WO | WO2021/217269 A1 | 11/2021 | |
| WO | WO 2022/049147 | 3/2022 | |
| WO | WO 2022/193007 | 9/2022 | |
| WO | WO 2022/217365 | 10/2022 | |
| WO | WO2022/221954 A1 | 10/2022 | |
| WO | WO 2022/229838 | 11/2022 | |
| WO | WO 2022/246546 | 12/2022 | |
| WO | WO 2022/253460 | 12/2022 | |
| WO | WO 2023/283721 | 1/2023 | |
| WO | WO 2023/049993 | 4/2023 | |
| WO | WO 2023/049994 | 4/2023 | |
| WO | WO 2023/092138 | 5/2023 | |
| WO | WO 2023/097403 | 6/2023 | |
| WO | WO 2023/097404 | 6/2023 | |
| WO | WO 2023/197064 | 10/2023 | |
| WO | WO 2023/197065 | 10/2023 | |
| WO | WO 2023/197066 | 10/2023 | |
| WO | WO 2023/242360 | 12/2023 | |

OTHER PUBLICATIONS

Noussan, M. et al., "The Role of Green and Blue Hydrogen in the Energy Transition—a Technological and Geopolitical Perspective", Sustainability, 2020, vol. 13, in 26 pages.

Great Britain Office Action in GB Application No. 2404413.3 dated May 16, 2024.

International Search Report and Written Opinion issued in PCT Application No. PCT/CA2024/050365, dated Jun. 17, 2024.

International Search Report and Written Opinion issued in PCT Application No. PCT/CA2022/051768, dated Mar. 6, 2023.

Office Action for U.S. Appl. No. 18/600,023 dated May 22, 2024.

Adair, Blake, "Ammonia: Transitioning to Net-Zero Future", Nutrien (2022).

Al-Qahtani, et al., "Uncovering the True Cost of Hydrogen Production Routes Using Life Cycle Monetisation", Applied Energy 281 (2021) 15958.

Alves et al., "Overview of Hydrogen Production Technologies from Biogas and the Applications in Fuel Cells", International Journal of Hydrogen Energy (2010) 1-11.

Ambrosetti et al., "A Numerical Investigation of Electrically-Heated Methane Steam Reforming Over Structured Catalysts", Frontiers in Chemical Engineering, 3 (2021) 747636.

An Introduction to Petroleum Refining and the Production of Ultra Low Sulfur Gasoline and Diesel Fuel. https://theicct.org/sites/default/files/publications/ICCT05_Refining_Tutorial_FINAL_R1.pdf. Access Date: Aug. 13, 2020.

Antonini et al, "Biomass to Hydrogen with CCS: can we go negative", https://www.sintef.no/globalassets/project/elegancy/documents/webinar3a/04-elegancy-final-presentation-ca-v2.pdf, Access date: Nov. 7, 2022.

Antonini et al., "Hydrogen Production from Natural Gas and Biomethane with Carbon Capture and Storage—a Techno-Environmental Analysis", Sustainable Energy Fuels, 4 (2020) 2967.

Arora et al. "Small-scale Ammonia Production from Biomass: a Techno-enviro-economic perspective." Industrial & Engineering Chemistry Research 55.22 (2016) 6422-6434.

Baker et al., "Hydrolysis of Cellulose Using Ternary Mixtures of Purified Cellulases," Applied Chemistry and Biotechnology, vol. 70-72 (1998) 395-403.

(56) References Cited

OTHER PUBLICATIONS

"Biomass with CO2 Capture and Storage (Bio-CCS) the Way Forward for Europe", European Technology Platform for Zero Emission Fossil Fuel Power Plants (2012).

"Blue Hydrogen—Groundbreaking Solutions for Hydrogen Production at Scale", Topsoe A/S, Denmark, (2022) 11 pages.

Boerrigter, "Green gas (SNG) in the Dutch Energy Infrastructure," Energy Research Centre of the Netherlands, ECN-RX-06-072 (Mar. 30, 2006) 1-11.

Boland, S., et al., GHG Emissions Reductions due to the RFS2, Life Cycle Associates, p. 1-14 (2015).

Borjesson et al. "Biogas as a resource-efficient vehicle fuel," Trends in Biotechnology, vol. 26, Issue 1 (2007) 7-13.

Brau Jean-Florian., "Production of Hydrogen for Oil Refining by Thermal Gasification of Biomass: Process Design, Integration and Evaluation", Thesis (2013) Chambers University of Technology, Sweden.

Brau et al., "Hydrogen for Oil Refining via Biomass Indirect Steam Gasification: Energy and Environmental Targets", Clean Techn. Environ. Policy (2013) 15, 501-512.

British Columbia BCBN Hydrogen Study Final Report https://www2.gov.bc.ca/assets/gov/government/ministries-organizations/zen-bcbn-hydrogen-study-final-v6.pdf, Access Date: Apr. 4, 2021.

California Executive Order S-01-07, Office of the Governor, Signed Jan. 18, 2007.

Carbolea, Animal Manures, Available Online at: www.carbolea.ul.ie/manures.php, Accessed Nov. 22, 2017.

"Clarification on Compliance with CertifHy Green Hydrogen Criteria for FCH JU Projects", www.fch.europa.eu Access date Jul. 27, 22.

"Clean and Renewable Energy from Pulp Mill Waste Using Microsludge and Anaerobic Digestion," Paradigm Environmental Technologies Inc. (2011) 1-2.

Clean Energy Strategies for Local Governments, 7.4 Landfill Methane Utilization (Dec. 10, 2008) 1-34.

Collins, Leigh, "New Clean Hydrogen Production Tax Credit of up to $3/Kg Approved by US House, Paving Way for Cheap Green H2" Access date Jul. 26, 2022.

Cortright et al. "Hydrogen from catalytic reforming of biomass-derived hydrocarbons in liquid water," Nature, vol. 418 (2002) 964-67.

Cruz et al. "Petroleum Refinery Hydrogen Production Unit: Exergy [sic] and Production Cost Evaluation," International Journal of Thermodynamics. vol. 11, No. 4 (2008) 187-93.

Cruz et al., "Exergy Analysis of Hydrogen Production via Biogas Dry Reforming", International Journal of Hydrogen Energy, V 43, 1 26, (2018) 11688-11695.

Definition of "Crude Oil", Random House Unabridged Dictionary, 2nd Ed., New York, 1993.

Energy Independence and Security Act of 2007, United States Cong. Energy Independence and Security Act of 2007, 110th Cong., Pub. L. 110-140, Enacted Dec. 19, 2007.

EPA, an Overview of Renewable Natural Gas from Biogas, Jul. 2020.

EPA, 2008b. Clean Energy Strategies for Local Governments, 7.4: Landfill Methane Utilization, Draft. Landfill Methane Outreach Program (LMOP), Climate Change Division, U.S. EPA. Dec. 10, 2008, in 34 pages. URL: https://www.epa.gov/sites/production/files/2015-12/documents/landfills.pdf.

Ewing et al., "Hydrogen on the Path to Net Zero—Costs and Climate Benefits", Pembina institute, Jul. 2020.

Ferreira-Aparicio et al., "New Trends in Reforming Technologies: from Hydrogen Industrial Plants to Multifuel Microreformers", Catalysis Reviews, 47, (2005), 491-588.

Final Assessment Report "Landfill Biogas Recovery and Utilization at the Santo Andre Municipal Sanitary Landfill Santo Andre, Brazil," Prepared under: U.S. Environmental Protection Agency Landfill Methane Outreach Program (2008) 1-31.

Full et al., A New Perspective for Climate Change Mitigation—Introducing Carbon-Negative Hydrogen Production from Biomass with Carbon Capture and Storage (HYBECCS), Sustainability (2021) 13 4026.

Gencer, Emre, et al. "Sustainable Production of Ammonia Fertilizers from Biomass." Biofuels, Bioproducts and Biorefining 14.4 (2020) 725-733.

Ghavam et al. "Sustainable Ammonia Production Processes." Frontiers in Energy Research 9 (2021) 34.

Gruia, Practical Advances in Petroleum Processing, vol. 1, Ed. by Chang S. Hsu and Paul R. Robinson, Springer, New York, Chapter 8, "Recent Advances in Hydrocracking" (2006) 219-55.

Guidance for the Certification of Co-Processing. Available online at: https://www.iscc-system.org/wp-content/uploads/2017/02/ISCC-Guidance-Document-203-01_Co-processing-requirements.pdf. Access date: Aug. 7, 2020.

Hakawati et al., "What is the Most Energy Efficient Route for Biogas Utilization: Heat, Electricity, or Transport?", Applied Energy 206 (2017) 1076-1087.

Hengeveld et al., "When Does Decentralized Production of Biogas and Centralized Upgrading and Injection into the Natural Gas Grid Make Sense", Biomass and Bioenergy, 67 (2014) 363-371.

Hidalgo, Maria, "Biomethane and Biohydrogen: the Future of Energy is Here", CARTIF Blog, Energy and Environment, Mar. 22, 2021, Access Date: Feb. 17, 2022.

Hovland, Jon, "Compression of Raw Biogas—a Feasibility Study", Report No. 2217020-1 (2017).

Howorth et al., "How Green is Blue Hydrogen", Energy Sci. Eng. (2021) 9 1676-1687.

"Hydrogen Strategy for Canada Seizing the Opportunities for Hydrogen" Access date Jan. 27, 2022.

IEAGHG Technical Review 2017-TR2, Feb. 2017. Techno-Economic Evaluation of SMR Based Standalone (Merchant) Hydrogen Plant with CCS. https://ieaghg.org/exco_docs/2017-02.pdf.

IEAGHG Technical Review 2017-TR3, Mar. 2017. Reference data and Supporting Literature Reviews for SMR based Hydrogen Production with CCS. https://ieaghg.org/publications/technical-reports/reports-list/10-technical-reviews/778-2017-tr3-reference-data-supporting-literature-reviews-for-smr-based-hydrogen-production-with-ccs.

Increasing Renewable Content with the Mass Balance Approach. https://www.nnfcc.co.uk/files/mydocs/Mass%20Balance.pdf. Access date: Jan. 18, 2022.

Jechura, John, Hydroprocessing: Hydrotreating & Hydrocracking. Chapters 7 & 9. Colorado School of Mines (2018). https://inside.mines.edu/~jjechura/Refining/08_Hydroprocessing.pdf.

Jesper et al. "Bio-SNG Potential Assessment: Denmark 2020," Riso National Laboratory for Sustainable Energy, Riso-R-1754 (Nov. 2010) 1-85.

Krich et al. Biomethane from Dairy Waste, "A Sourcebook for the Production and Use of Renewable Natural Gas in California" (Jul. 2005) 66-67 and 81-106.

Kurokawa et al., "Energy-Efficient Distributed Carbon Capture in Hydrogen Production from Natural Gas", Energy Procedia 4 (2011) 674-680.

Latvala, "Using Biogas in the Production of Liquid Transport Fuels as Hydrogen Source," Second Nordic Biogas Conference, Malmo, Sweden (2008) 1-13.

Marcoberardino et al., "Green Hydrogen Production from Raw Biogas: a Techno-Economic Investigation of Conventional Processes Using Pressure Swing Adsorption Unit", Processes 6 (2018) 19.

McPhail et al., The Renewable Identification System and U.S. Biofuel Mandates, USDA, BIO-03, Nov. 2011.

Mezei, "Options for Upgrading Digester Biogas to Pipeline Quality," Flotech Services (2010) 1-15.

Milbrandt et al., "Biogas and Hydrogen Systems Market Assessment", National Renewable Energy Laboratory (NREL). Technical Report NREL/TP-6A20-63596, Mar. 2016.

Milne et al. "Hydrogen from Biomass State of the Art and Research Challenges." National Renewable Energy Laboratory, a Report for the International Energy Agency Agreement on the Production and

(56)　　　　　References Cited

OTHER PUBLICATIONS

Utilization of Hydrogen Task 16, Hydrogen from Carbon-Containing Materials (2002) 1-78.

Mozaffarian et al. "Green Gas (SNG) Production by Supercritical Gasification of Biomass," Energy Research Centre of the Netherlands, ENC-C-04-081, (Nov. 2004), 1-71.

Muradov et al., "Hydrogen production by catalytic processing of renewable methane-rich gases", Int. J. of Hydrogen Energy, 33, (2008) 2033-2035.

Najafpour et al., "Hydrogen as clean fuel via continuous fermentation by anaerobic photosynthetic bacteria, Rhodospirillum rubrum," African Journal of Biotechnology vol. 3, Issue 10 (2004) 503-7.

Naqvi, Syed, "Hydrogen Production", PEP Report 32C, SRI Consulting (2007).

"Natural Gas Processing: the Crucial Link Between Natural Gas Production and Its Transportation to Market," Energy Information Administration, Office of Oil and Gas (2006) 1-11.

Ni, et al., "An Overview of Hydrogen Production from Biomass", Fuel Processing Technology 87 (2006) 461-472.

Oni et al., "Comparative Assessment of Blue Hydrogen from Steam Methane Reforming, Autothermal Reforming, and Natural Gas Decomposition Technologies for natural gas-producing regions", Energy Conversion and Management 254 (2022) 115245.

Parkinson et al., "Hydrogen Production using Methane: Techno-Economics of Decarbonizing Fuels and Chemicals", International Journal of Hydrogen Energy, 43 (2018) 2540.

"Part II—Environmental Protection Agency—40 CFR Part 80 Regulation of Fuels and Fuel Additives: Changes to Renewable Fuel Standard Program; Final Rule", Federal Register, vol. 75(58), Mar. 26, 2010, in 236 pages. URL: https://www.gpo.gov/fdsys/pkg/FR-2010-03-26/pdf/2010-3851.pdf.

Prospects of Hydrogen from Biomass, IEA Hydrogen Implementing Agreement, Annex 16, Subtask B, Final Report, (2006) 1-69.

Rapier, Robert "Estimating the Carbon Footprint of Hydrogen Production", Forbes, Jun. 6, 2020.

Rau et al., "Production of Hydrogen by Autothermal Reforming of Biogas", Energy Procedia 120 (2017) 294-301.

Regalbuto, "An NSF perspective on next generation hydrocarbon biorefineries," Computers and Chemical Engineering 34 (2010) 1393-1396.

Robinson et al., "Hydrotreating and Hydrocracking: Fundamentals", Practical Advances in Petroleum Processing, vol. 1, Ed. by Chang S. Hsu and Paul R. Robinson, Springer, New York, Chapter 7 (2006) 177-218.

RTFO Guidance Part One Process Guidance. 2020.

Salary, et al., "Design of Oil Refineries Hydrogen Network Using Process Integration Principles", Iran. J. Chem. Chem. Eng., vol. 27, No. 4, (2008), 49-64.

Sanchez et al., "Biomass Based Sustainable Ammonia Production", 2019 AIChE Annual Meeting. AIChE, 2019.

Santos, Stanley, "Understanding the Potential of CCS in Hydrogen Production", Process Industry CCS Workshop (2015).

Schanbacher, "Anaerobic Digestion: Overview and Opportunities," Waste to Energy Workshop: Advances and Opportunities for Ohio's Livestock and Food Processing Industries, OARDC (Apr. 7, 2009) 1-28.

Schill, Susanne, "Iowa to Get First Biomass-to-Ammonia Plant", https://biomassmagazine.com/articles/2613/iowa-to-get-first-biomass-to-ammonia-lant/#:~:text=SynGest%20Inc.%20has%20secured%20a,deploy%20in%20its%20first%20plant., Access date: Feb. 17, 2022.

Schimmel et al., "Determining the renewability of co-processed fuels; Final Report", ECOFYS, Apr. 2018.

Serrano-Ruiz et al. "Catalytic routes for the conversion of biomass into liquid hydrocarbon transportation fuels," Energy & Environmental Science, 4 (2011) 83-99.

Shiga et al. "Large-Scale Hydrogen Production from Biogas," International Journal of Hydrogen Energy, vol. 23, No. 8 (1998) 631-40.

Show et al., "Design of Bioreactors for Biohydrogen production", Journal of Scientific & Industrial Research, vol. 67 (2008), pp. 941-949.

Spath et al. "Life Cycle Assessment of Hydrogen Production via Natural Gas Steam Reforming," NREL/TP-570-27637 (2000) 1-24.

Stavrakas et al., "Striving Towards the Deployment of Bio-energy with Carbon Capture and Storage (BECCS): a review of Research Priorities and Assessment Needs", Sustainability 2018, 10, 2206.

Streb et al., "Novel Adsorption Process for Co-Production of Hydrogen and CO2 from a Multicomponent Stream—Part 2: Application to Steam Methane Reforming and Autothermal Reforming Gases", Ind. Eng. Chem. Res. 59 (2020) 10093-10109.

Sun, et al., "Selection of Appropriate Biogas Upgrading Technology—a Review of Biogas Cleaning, Upgrading and Utilisation", Renewable and Sustainable Energy Reviews 51 (2015) 521-532.

Sun, et al., "Updates of Hydrogen Production from SMR Process in GREET". 2019.

Taylor, R., et al., "Options for a UK low carbon hydrogen standard: Final Report", Department for Business, Energy & Industrial Strategy, E4tech, May 2021.

"The Role of Biogas & RNG in Hydrogen Production & Decarbonization", BayoTech (2020).

Transportation Fuels from Biomass via IH2 Technology, IEA Bioenergy Conference, 2012. 1-25.

Union Calendar No. 94, 117$^{th}$ Congress 1st Session, H.R. 5376 (Report No. 117-130) (2021).

U.S. Climate Change Technology Program—Technology Options for the Near and Long Term, Methane Emissions from Energy and Waste, "Conversion of Landfill Gas to Alternative Uses," section 4.1.2 (2003) 153-155.

Van Der Drift, "SNG: a New Biomass-Based Energy Carrier," Energy Research Centre of the Netherlands (Apr. 23, 2006) 1-21.

Van Der Meijden et al. "Production of bio-methane from woody biomass," Energy Research Centre of the Netherlands, ECN-M-09-086, (Jun. 2009) 1-8.

Wang, "Low Carbon Steam Reforming-Based Hydrogen Production". https://www.gasliquids.com/wp-content/uploads/2020_Hydrogen-Production-Using-Steam-Methane-Reforming.pdf. Access date: Feb. 6, 2021.

Wang et al., The Life-Cycle Analysis of Petroleum Fuels and Biofuels with GREET. Argonne National Laboratory. Dec. 13, 2016 https://ww2.arb.ca.gov/sites/default/files/classic/fuels/lcfs/lcfs_meetings/12132016wang.pdf Access date: Jun. 2, 2020.

Worley, et al., "Biomass Gasification Technology Assessment," National Renewable Energy Laboratory (Nov. 2012) 1-358.

Yang et al., "Cost and Lifecycle Greenhouse Gas Implications of Integrating Biogas Upgrading and Carbon Capture Technologies in Cellulosic Biorefineries", Environ. Sci. Technol., 2020, 54, 12810-12819.

"Zero Carbon Hydrogen—Is it Achievable?" https://www.wsp.com/en-GB/insights/zero-carbon-hydrogen-is-it-ievable#:~:text=By%20balancing%20hydrogen%20production%20between,for%20the%20decarbonisation%20of%20heat. Access date: Mar. 5, 2021.

Zhou et al., "Life-cycle Greenhouse Gas Emissions of Biomethane and Hydrogen Pathways in the European Union", https://theicct.org/publication/life-cycle-greenhouse-gas-emissions-of-biomethane-and-hydrogen-pathways-in-the-european-union/ Access Date: Nov. 7, 2022.

Dinca, et al., "CO$_2$ Capture from Syngas Generated by a Biomass Gasification Power Plant with Chemical Absorption Process", Energy (2018).

Wismann, et al., "Electrified methane reforming: a compact approach to greener industrial hydrogen production", Science (2019), 364 (6442), 756-759.

Brown, Trevor. "Renewable Hydrogen for Sustainable Ammonia Production." Chemical Engineering Progress (2019) 47-53.

"Keeping on Pace for Net Zero: Delegated Act to specify the methodology to determine the share of biofuels and biogas used in transport resulting from biomass being processed with fossil fuels in a common process", Feedback from: logen Corporation in response to European Commission, "Renewable energy—Method for Calculating the Share of Renewables in the Case of Co-processing", Feedback reference F3325697 submitted on Jul. 20, 2022, https://

(56) References Cited

OTHER PUBLICATIONS ec.europa.eu/info/law/better-regulation/have-your-say/initiatives/ 12711-Renewable-energy-method-for-calculating-the-share-of-renewables-in-the-case-of-co-processing/F3325697_en, Access Date: Oct. 26, 2022.

"Hydrogen in a Low-Carbon Economy", Committee on Climate Change, Nov. 2018.

Department for Transport, "Renewable Transport Fuel Obligation Guidance Part One Process Guidance Year 11: Apr. 15, 2018 to Dec. 31, 2018", V 11.0, Apr. 2018, 75 pages.

Rosa et al., "Potential for hydrogen production from sustainable biomass with carbon capture and storage", Renewable and Sustainable Energy Reviews 157 (2022) 112123.

International Search Report and Written Opinion issued in PCT Application No. PCT/CA2023/050486 dated Jun. 14, 2023.

International Search Report and Written Opinion issued in PCT Application No. PCT/CA2023/050484 dated Jun. 22, 2023.

Office Action issued in parent U.S. Appl. No. 18/162,950 dated Apr. 17, 2023.

International Preliminary Report on Patentability issued in PCT Application No. PCT/CA2023/050486, dated Oct. 24, 2024.

International Preliminary Report on Patentability issued in PCT Application No. PCT/CA2023/050484, dated Oct. 24, 2024.

"R&D Greet® Model—the Greenhouse Gases, Regulated Emissions, and Energy use in Technologies Model", Argonne National Laboratory, webpage accessed Feb. 5, 2024. URL: https://greet.anl. gov/.

"The potential role of blue hydrogen in low-carbon energy markets in the US", American Petroleum Institute (API), dated Oct. 12, 2022, in 160 pages.

Cloete et al., "System-friendly process design: Optimizing blue hydrogen production for future energy systems", Energy 259, Nov. 2022, 124954.

Denholm et al., "Examining supply-side options to achieve 100% clean electricity by 2035", Golden, CO: National Renewable Energy Laboratory, 2022, NREL/TP-6A40-81644, in 161 pages.

Geissler et al., "Analysis of alternative bioenergy with carbon capture strategies: present and future," Energy & Environmental Science, 2022, vol. 15, pp. 2679-2689.

Lewis et al., "Comparison of commercial, state-of-the-art, fossil-based hydrogen production technologies," National Energy Technology Laboratory, dated Apr. 12, 2022, DOE/NETL-2022/3241, in 327 pages.

Spath et al., "Life Cycle Assessment of Hydrogen Production via Natural Gas Steam Reforming", National Renewable Energy Laboratory, NREL/TP-570-27637, Feb. 2001, in 33 pages.

Wang, M. et al., "Greenhouse gases, Regulated Emissions, and Energy use in Technologies Model® (2022 .Net)", Computer Software. USDOE Office of Energy Efficiency and Renewable Energy (EERE), Oct. 10, 2022. URL: https://www.osti.gov/doecode/biblio/ 81029 (NPL document includes only the abstract).

Wikipedia, "Greenhouse gas emissions", page last edited Nov. 21, 2021 (accessed Nov. 29, 2021), in 23 pages. URL: https://en. wikipedia.org/wiki/Greenhouse_gas_emissions.

METHOD FOR MAKING LOW CARBON INTENSITY HYDROGEN

TECHNICAL FIELD

The disclosure relates to a process for producing hydrogen having a carbon intensity equal to or lower than a target carbon intensity.

BACKGROUND

Hydrogen is a ubiquitous fuel used in a wide range of industries. Its most common and established use is in hydroprocessing units of oil refineries where it is used to upgrade crude oil derived streams to make gasoline and other refinery products. However, hydrogen also finds use in the established Haber-Bosch process to make ammonia. More recently, there has been interest in its direct use as a fuel for automobiles and in fuel cells.

A common method to make hydrogen is by a process referred to as reforming. Reforming involves reacting methane in the presence of a catalyst typically to make syngas, which comprises hydrogen and carbon monoxide, among other components, with an optional step of a water-gas shift to produce more hydrogen.

A conventional reforming process uses natural gas as a feedstock. While natural gas is abundant and readily available, it is fossil-derived and is associated with high carbon intensity. More environmentally-friendly processes to make hydrogen, such as by electrolysis, using solar energy and biological processes, are potential alternatives, but are still in various phases of research and development. In addition, these green alternatives are capital intensive and therefore challenging to implement on a commercial scale.

While the continued use of reforming to make hydrogen from natural gas avoids the high cost of replacing or modifying the existing process with the greener alternatives, there still remains a high demand for clean hydrogen (low or negative carbon intensity (CI) or hydrogen produced through processes that have lower lifecycle greenhouse gas emissions). Indeed, policy-makers around the world are pushing for ever-lower carbon content in fuels and industrial products, and many countries have either legislated or are in the process of implementing legislation setting out clean hydrogen targets. This includes, for example, the potential Build Back Better Bill in the United States. However, in order for hydrogen producers to benefit the most from such legislation, a reduction in carbon intensity relative to conventional fossil-based hydrogen production typically is needed. In some instances, the target set by regulations may be as much as a 95% or more reduction in lifecycle greenhouse gas (GHG) emissions (relative to a predetermined baseline) to achieve maximum benefits (e.g., in the form of fuel credits or other credits), but this is challenging to achieve without incurring significant capital cost.

There is a need for hydrogen production facilities, including but not limited to those that have already implemented GHG emissions reductions, to satisfy ever-increasing clean hydrogen standards. The disclosure addresses this need and/or provides useful alternatives to known processes so as to produce hydrogen that meets a target carbon intensity.

SUMMARY

The present disclosure addresses one or more of the foregoing needs and/or problems in the art.

In particular, the present disclosure provides a process that enables hydrogen produced in a hydrogen production facility to meet a target CI (i.e., have a CI equal to or lower than the target CI). In some embodiments, the method achieves 80% or more reductions in GHG emissions (relative to a predetermined baseline) associated with hydrogen production. Advantageously, this enables maximum benefits in the form of government incentives, such as fuel credits or other credits, to incentivize clean hydrogen production. At the same time, some of the processes disclosed herein advantageously avoid or reduce any additional capital cost that may otherwise be needed to meet such high GHG emissions target reductions. In some embodiments, the method achieves a high percent reduction in GHG emissions (relative to a predetermined baseline), while keeping the biomethane share of gas flow relatively low. For example, an 80% reduction in GHG emissions associated with hydrogen production can be achieved when the biomethane share of gas flow is less than 30%, less than 25%, less than 20%, or less than 15%. The disclosed process for reducing the carbon intensity of hydrogen is designed to reduce greenhouse gas (GHG) emissions and mitigate climate change.

In one aspect, the present disclosure provides a process of producing hydrogen that meets a target carbon intensity ($CI_T$), the process comprising: at a facility that produces hydrogen by reforming non-renewable gaseous feedstock, replacing a fraction of the non-renewable gaseous feedstock with biomethane feedstock and obtaining hydrogen that meets the $CI_T$, wherein the non-renewable gaseous feedstock that is replaced is (a) feedstock fed to methane reforming, (b) feedstock used to generate heat for the reforming, or (c) a combination of (a) and (b), wherein the $CI_T$ reflects a lifecycle greenhouse gas (GHG) emissions reduction that is at least 70% relative to when the hydrogen is produced using only the non-renewable gaseous feedstock, wherein the biomethane feedstock has a carbon intensity (CI) value within a range that is between 15 g $CO_2$eq/MJ and −500 g $CO_2$eq/MJ, said CI value obtained at least in part by one or any combination of: capturing and sequestering carbon dioxide generated from an anaerobic digestion or gasification that formed the biomethane feedstock; capturing and sequestering carbon from residue of the anaerobic digestion or gasification that formed the biomethane feedstock; using a renewable energy source to at least partially power a production process for producing the biomethane feedstock; and processing waste and avoiding emissions of methane to atmosphere that would otherwise have been released without production and collection of the biomethane feedstock, and wherein the fraction of the non-renewable gaseous feedstock that is replaced by the biomethane feedstock is (i) less than 50% and (ii) at least r, where r is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g $CO_2$eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the hydrogen production facility, k=net amount of carbon dioxide captured and sequestered per unit of hydrogen produced in g CO₂eq/MJ associated with hydrogen production, and wherein k is zero when no carbon dioxide is captured and sequestered, C_r=carbon dioxide emissions reduction per unit of hydrogen produced in g CO₂eq/MJ attributable to using renewable power in or associated with hydrogen production, $CI_{NRGF}$=the carbon intensity of the non-renewable gaseous feedstock (NRGF) fed to the hydrogen production facility, $CI_B$=carbon intensity of biomethane feedstock fed to the hydrogen production facility, and y=a ratio of energy of the hydrogen produced in MJ to the sum of energy of the non-renewable gaseous feedstock in MJ and energy of the biomethane feedstock in MJ.

In one aspect, the present disclosure provides a process for producing hydrogen that meets a target carbon intensity ($CI_T$), the process comprising: (i) introducing biomethane feedstock into a hydrogen production facility that produces the hydrogen by reforming, the biomethane feedstock having a carbon intensity (CI) value within a range that is between 15 g CO₂eq/MJ and −500 g CO₂eq/MJ; (ii) replacing, at the hydrogen production facility, a fraction of the non-renewable gaseous feedstock with the biomethane feedstock, wherein the non-renewable gaseous feedstock replaced is (a) feedstock fed to methane reforming and/or (b) feedstock used to generate heat for the reforming in the hydrogen production, and wherein the fraction of the non-renewable gaseous feedstock replaced by the biomethane feedstock is less than 30%; (iii) obtaining the $CI_T$ of the hydrogen by at least: selecting an amount of the non-renewable gaseous feedstock to be replaced represented by r, wherein r is the fraction of the non-renewable gaseous feedstock replaced by the biomethane feedstock and wherein r is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g CO₂eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the hydrogen production facility, k=net amount of carbon dioxide captured and sequestered per unit of hydrogen produced in g CO₂eq/MJ associated with hydrogen production, and wherein k is zero when no carbon dioxide is captured and sequestered, C_r=carbon dioxide emissions reduction per unit of hydrogen produced in g CO₂eq/MJ attributable to using renewable power in or associated with hydrogen production, $CI_{NRGF}$=the carbon intensity of the non-renewable gaseous feedstock (NRGF) fed to the hydrogen production facility, $CI_B$=carbon intensity of biomethane feedstock fed to the hydrogen production facility, and y=a ratio of energy of the hydrogen produced in MJ to the sum of energy of the non-renewable gaseous feedstock in MJ and the energy of the biomethane feedstock in MJ; and (iv) obtaining the hydrogen that meets the $CI_T$, wherein the hydrogen so obtained has at least a 70% reduction in carbon emissions relative to the hydrogen production facility using only the non-renewable gaseous feedstock.

In one aspect, the present disclosure provides a process of producing hydrogen that meets a target carbon intensity ($CI_T$), the process comprising: providing biomethane feedstock to a facility that produces hydrogen by reforming non-renewable gaseous feedstock, the biomethane feedstock having a CI value within a range that is between 15 g CO₂eq/MJ and −500 g CO₂eq/MJ, said CI value obtained at least in part by one or any combination of: capturing and sequestering carbon dioxide generated from an anaerobic digestion or gasification that formed the biomethane feedstock; capturing and sequestering carbon from a residue of the anaerobic digestion or gasification that formed the biomethane feedstock; using a renewable energy source to at least partially power a production process for producing the biomethane feedstock; and processing waste and avoiding emissions of methane to atmosphere that would otherwise have been released without production and collection of the biomethane feedstock; wherein the biomethane feedstock is provided in an amount selected to replace a fraction of the non-renewable gaseous feedstock with the biomethane feedstock and obtain the hydrogen that meets the $CI_T$, wherein the non-renewable gaseous feedstock replaced is (a) feedstock fed to methane reforming, (b) feedstock used to generate heat for the reforming, or (c) a combination of (a) and (b), wherein the fraction of the non-renewable gaseous feedstock replaced by the biomethane feedstock is less than 50%, and wherein the fraction of the non-renewable gaseous feedstock replaced by the biomethane feedstock is at least r, where r is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g CO₂eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the hydrogen production facility, k=net amount of carbon dioxide captured and sequestered per unit of hydrogen produced in g CO₂eq/MJ associated with hydrogen production, and wherein k is zero when no carbon dioxide is captured and sequestered, C_r=carbon dioxide emissions reduction per unit of hydrogen produced in g CO₂eq/MJ attributable to using renewable power in or associated with hydrogen production, $CI_{NRGF}$=the carbon intensity of the non-renewable gaseous feedstock (NRGF) fed to the hydrogen production facility, $CI_B$=carbon intensity of biomethane feedstock fed to the hydrogen production facility, and y=a ratio of energy of the hydrogen produced in MJ to the sum of energy of the non-renewable gaseous feedstock in MJ and the biomethane feedstock in MJ; and wherein the hydrogen obtained that meets the $CI_T$ has at least a 70% reduction in carbon emissions relative to the hydrogen produced using only the non-renewable gaseous feedstock.

In one aspect, the present disclosure provides a process of producing hydrogen that meets a target carbon intensity ($CI_T$), the process comprising: (i) providing biomethane feedstock at a facility that produces hydrogen by reforming non-renewable gaseous feedstock, the biomethane feedstock having a carbon intensity value (CI) value within a range that is between 15 g CO₂eq/MJ and −500 g CO₂eq/MJ, said CI value obtained at least in part by one or any combination of: capturing and sequestering carbon dioxide generated from an anaerobic digestion or gasification that formed the biomethane feedstock; capturing and sequestering carbon from a residue of the anaerobic digestion or gasification that formed the biomethane feedstock; using a renewable energy source to at least partially power a production process for producing the biomethane feedstock; and processing waste and avoiding emissions of methane to atmosphere that would otherwise have been released without production and collection of the biomethane feedstock; (ii) determining a fraction of the non-renewable gaseous feedstock to be replaced with the biomethane feedstock to obtain the $CI_T$ of the hydrogen, wherein the non-renewable gaseous feedstock replaced is (a) feedstock fed to methane reforming, (b) feedstock used to generate heat for the reforming, or (c) a combination of (a) and (b), wherein the fraction of the non-renewable gaseous feedstock replaced by the biomethane feedstock is less than 50%, and wherein the fraction of the non-renewable gaseous feedstock replaced by the biomethane feedstock, r, is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g $CO_2$eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the hydrogen production facility, k=net amount of carbon dioxide captured and sequestered per unit of hydrogen produced in g $CO_2$eq/MJ associated with hydrogen production, and wherein k is zero when no carbon dioxide is captured and sequestered, $C_r$=carbon dioxide emissions reduction per unit of hydrogen produced in g $CO_2$eq/MJ attributable to using renewable power in or associated with hydrogen production, $CI_{NRGF}$=the carbon intensity of the non-renewable gaseous feedstock (NRGF) fed to the hydrogen production facility, $CI_B$=carbon intensity of biomethane feedstock fed to the hydrogen production facility, and y=a ratio of energy of the hydrogen produced in MJ to the sum of energy of the non-renewable gaseous feedstock in MJ and the energy of biomethane feedstock in MJ, and (iii) obtaining hydrogen that meets the $CI_T$ using feedstock comprising the non-renewable gaseous feedstock and the biomethane feedstock, wherein a fraction of the feedstock that is the biomethane feedstock is at least r, and wherein the hydrogen so obtained has at least a 70% reduction in carbon emissions relative to hydrogen produced using only the non-renewable gaseous feedstock.

In one aspect, the present disclosure provides a process of producing hydrogen that meets a target carbon intensity ($CI_T$), the process comprising: (i) providing biomethane feedstock at a facility that produces hydrogen by reforming non-renewable gaseous feedstock, the biomethane feedstock having a CI value within a range that is between 15 g $CO_2$eq/MJ and −500 g $CO_2$eq/MJ; (ii) replacing a fraction of the non-renewable gaseous feedstock with the biomethane feedstock, wherein the non-renewable gaseous feedstock replaced is (a) feedstock fed to methane reforming, (b) feedstock used to generate heat for the reforming in the hydrogen production, or (c) a combination of (a) and (b), wherein the fraction of the non-renewable gaseous feedstock replaced by the biomethane feedstock is less than 30%; and (iii) obtaining the hydrogen that meets the $CI_T$, wherein the $CI_T$ of the hydrogen is met by using a sufficient amount of biomethane feedstock to make the fraction of the non-renewable gaseous feedstock replaced by the biomethane feedstock be at least r, wherein r is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g $CO_2$eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the hydrogen production facility, k=net amount of carbon dioxide captured and sequestered per unit of hydrogen produced in g $CO_2$eq/MJ associated with hydrogen production, and wherein k is zero when no carbon dioxide is captured and sequestered, $C_r$=carbon dioxide emissions reduction per unit of hydrogen produced in g $CO_2$eq/MJ attributable to using renewable power in or associated with hydrogen production, $CI_{NRGF}$=the carbon intensity of the non-renewable gaseous feedstock (NRGF) fed to the hydrogen production facility, $CI_B$=carbon intensity of biomethane feedstock fed to the hydrogen production facility, and y=a ratio of energy of the hydrogen produced in MJ to the sum of energy of the non-renewable gaseous feedstock in MJ and the biomethane feedstock in MJ.

In one aspect, the present disclosure provides a process for reducing the carbon intensity of hydrogen by replacing, at a hydrogen production facility, a fraction of a non-renewable gaseous feedstock with a biomethane feedstock, wherein the non-renewable gaseous feedstock replaced is (a) a feedstock fed to methane reforming; and/or (b) a feedstock used to generate heat for the reforming in the hydrogen production, and wherein the fraction of the non-renewable gaseous feedstock replaced by the biomethane feedstock is less than 50% and in some embodiments is defined by Equation A herein. The biomethane feedstock has a carbon intensity (CI) value within a range that is between 15 g $CO_2$eq/MJ and −500 g $CO_2$eq/MJ. As set forth below, the CI of the biomethane that is between 15 g $CO_2$eq/MJ and −500 g $CO_2$eq/MJ is measured using a GREET method as described herein.

In one aspect, the present disclosure provides a process for reducing a carbon intensity of hydrogen produced by reforming, the process comprising: (i) operating a hydrogen production facility that produces the hydrogen by reforming a gaseous feedstock; (ii) providing a biomethane feedstock having a carbon intensity value (CI) value within a range that is between 15 g $CO_2$eq/MJ and −500 g $CO_2$eq/MJ. In some embodiments, the CI value is obtained at least in part by one or any combination of: (a) capturing and sequestering carbon dioxide generated from an anaerobic digestion or gasification that formed the biomethane feedstock; (b) capturing and sequestering carbon from a residue of the anaerobic digestion that formed the biomethane feedstock; (c) using a renewable energy source to at least partially power a production process for producing the biomethane feedstock; and (d) processing animal waste and avoiding emissions of methane to atmosphere that would otherwise have been released without production and collection of the biomethane feedstock.

The process in some embodiments further comprises (iii) introducing the biomethane feedstock into the hydrogen production facility; (iv) replacing, at the hydrogen production facility, a fraction of the non-renewable gaseous feedstock with the biomethane feedstock, wherein the non-renewable gaseous feedstock replaced is (a) a feedstock fed to methane reforming; and/or (b) a feedstock used to generate heat for the reforming in the hydrogen production facility, wherein the fraction of the non-renewable gaseous feedstock replaced is less than 50%; (v) obtaining the target carbon intensity ($CI_T$) of the hydrogen by at least: selecting an amount of the non-renewable gaseous feedstock to be replaced represented by r, wherein r is the fraction of the non-renewable gaseous feedstock replaced by the biomethane feedstock.

The r is determined by the following Equation A:

$$r = \frac{(CI_i - CI_T - k - C_r)}{(CI_{NRGF} - CI_B)} \cdot y.$$

Equation A

The CI values of Equation A are in g $CO_2$eq/MJ.

It should be understood that the CI values in Equation A are determined by prevailing regulations and each CI value is determined using the same methodology. While the $CI_B$ of Equation A is calculated using prevailing regulations, it should be understood that in those embodiments in which the biomethane introduced to the hydrogen production facility has a CI between 15 g $CO_2$eq/MJ and −500 g $CO_2$eq/MJ, such CI value is measured using a GREET method as described herein.

$CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the hydrogen production facility, k=net amount of carbon dioxide captured and sequestered per unit of hydrogen produced in g $CO_2$eq/MJ associated with hydrogen production, and wherein k is zero when no carbon dioxide is captured and sequestered, $C_r$=carbon dioxide emissions reduction per unit of hydrogen produced in g $CO_2$eq/MJ attributable to using renewable power in or associated with hydrogen production, $CI_{NRGF}$=the carbon intensity of the non-renewable gaseous feedstock (NRGF) fed to the hydrogen production facility, $CI_B$=carbon intensity of biomethane feedstock when it is fed to the hydrogen production facility, and y=a ratio of energy of the hydrogen produced in MJ to energy of the non-renewable gaseous feedstock and the biomethane feedstock in MJ.

(vi) obtaining the hydrogen from the hydrogen production facility that meets the target carbon intensity ($C_{IT}$), and wherein the hydrogen so obtained has at least a 70% reduction in carbon emissions relative to the hydrogen production facility using only the non-renewable gaseous feedstock.

A further aspect of the disclosure provides a process for producing hydrogen that meets a target carbon intensity ($CI_T$), the process comprising: (i) introducing a biomethane feedstock into a hydrogen production facility that produces the hydrogen by reforming, the biomethane feedstock having a carbon intensity (CI) value within a range that is between 15 g $CO_2$eq/MJ and −500 g $CO_2$eq/MJ; (ii) replacing, at the hydrogen production facility, a fraction of the non-renewable gaseous feedstock with the biomethane feedstock, wherein the non-renewable gaseous feedstock replaced is (a) a feedstock fed to methane reforming; and/or (b) a feedstock used to generate heat for the reforming in the hydrogen production, and wherein the fraction of the non-renewable gaseous feedstock replaced by the biomethane feedstock is less than 50%; (iii) obtaining the target carbon intensity ($CI_T$) of the hydrogen by at least: selecting an amount of the non-renewable gaseous feedstock to be replaced represented by r, wherein r is the fraction of the non-renewable gaseous feedstock replaced by the biomethane feedstock and wherein r is determined by the following Equation A:

$$r = \frac{(CI_i - CI_T - k - C_r)}{(CI_{NRGF} - CI_B)} \cdot y$$

wherein the CI values of Equation A are in g $CO_2$eq/MJ and wherein each parameter is as described above; and (iv) obtaining the hydrogen that meets the target carbon intensity ($C_{IT}$), and wherein the hydrogen so obtained has at least a 70% reduction in carbon emissions relative to the hydrogen production facility using only the non-renewable gaseous feedstock.

According to any one of the foregoing aspects, in one embodiment, the hydrogen production facility provides carbon dioxide produced during hydrogen production for sequestration.

According to any one of the foregoing aspects or embodiments, the process according to some embodiments further comprises obtaining one or more credits resulting from producing the hydrogen that meets the target carbon intensity ($CI_T$). The $CI_T$ in such embodiments can be established based on thresholds set by regulators or measured relative to a baseline as set by regulators, which is typically a fossil baseline.

According to any one of the foregoing aspects or embodiments, the hydrogen so obtained has at least a 60%, 70%, 80% or 85% reduction in carbon emissions relative to the hydrogen production facility using only the non-renewable gaseous.

In some embodiments of the foregoing aspects or embodiments, the amount of non-renewable gaseous feedstock replaced by the biomethane feedstock is less than 45%, 30% or 25%.

In an alternative embodiment, the amount of non-renewable gaseous feedstock replaced by the biomethane feedstock is greater than 70% and wherein the hydrogen so obtained has at least a 85%, 90% or 95% reduction in carbon emissions relative to the hydrogen production facility using only the non-renewable gaseous feedstock.

In some embodiments of the foregoing aspects or embodiments, the CI value of the biomethane feedstock is a negative value.

In further embodiments of the foregoing aspects or embodiments, the negative value of the CI value of the biomethane feedstock is due at least in part to the capturing and sequestration of the carbon dioxide generated from the anaerobic digestion or gasification that formed the biomethane feedstock.

In further embodiments of the foregoing aspects or embodiments, the negative value of the CI value of the biomethane feedstock is due at least in part to carrying out or causing at least any two or three of: capturing and sequestering of the carbon dioxide generated from an anaerobic digestion or gasification that formed the biomethane feedstock; capturing and sequestering carbon from the residue of the anaerobic digestion or gasification that formed the biomethane feedstock; using the renewable energy source to power a production process for producing or upgrading the biomethane feedstock; or processing animal waste and avoiding emissions of methane to atmosphere that would otherwise have been released without production and collection of the biomethane feedstock.

In further embodiments of the foregoing aspects or embodiments, the negative value of the CI value of the biomethane feedstock is due at least in part to at least any two or three of: capturing and sequestering of the carbon dioxide generated from an anaerobic digestion that formed the biomethane feedstock; capturing and sequestering carbon from the residue of the anaerobic digestion that formed the biomethane feedstock; using the renewable energy source to at least partially power a production process for producing or upgrading the biomethane feedstock; or processing animal waste and avoiding emissions of methane to atmosphere that would otherwise have been released without production and collection of the biomethane feedstock.

According to any one of the foregoing aspects or embodiments, the CI of the biomethane feedstock is between −25 $gCO_2eq/MJ$ and −300 g $CO_2eq/MJ$, between −50 g $CO_2eq/MJ$ and −250 g $CO_2eq/MJ$ or between −75 g $CO_2eq/MJ$ and −250 g $CO_2eq/MJ$.

According to any one of the foregoing aspects or embodiments, the biomethane feedstock is derived at least in part from a biomass that is livestock manure, food scrap waste or a combination thereof.

According to any one of the foregoing aspects or embodiments, the replacing comprises replacing the non-renewable gaseous feedstock fed to methane reforming with the biomethane feedstock.

According to any one of the foregoing aspects or embodiments, the replacing comprises replacing the non-renewable gaseous feedstock used to generate heat for the reforming in the hydrogen production facility with the biomethane feedstock.

According to any one of the foregoing aspects or embodiments, the hydrogen production facility produces the hydrogen by methane reforming comprising a water gas shift.

According to any one of the foregoing aspects or embodiments, the non-renewable gaseous feedstock is natural gas, refinery gas, liquid petroleum gas (LPG), light naphtha, heavy naphtha and/or straight-run naphtha.

According to any one of the foregoing aspects or embodiments, the non-renewable gaseous feedstock is natural gas.

DETAILED DESCRIPTION

Producing a Biomethane Feedstock

Figure 1A:
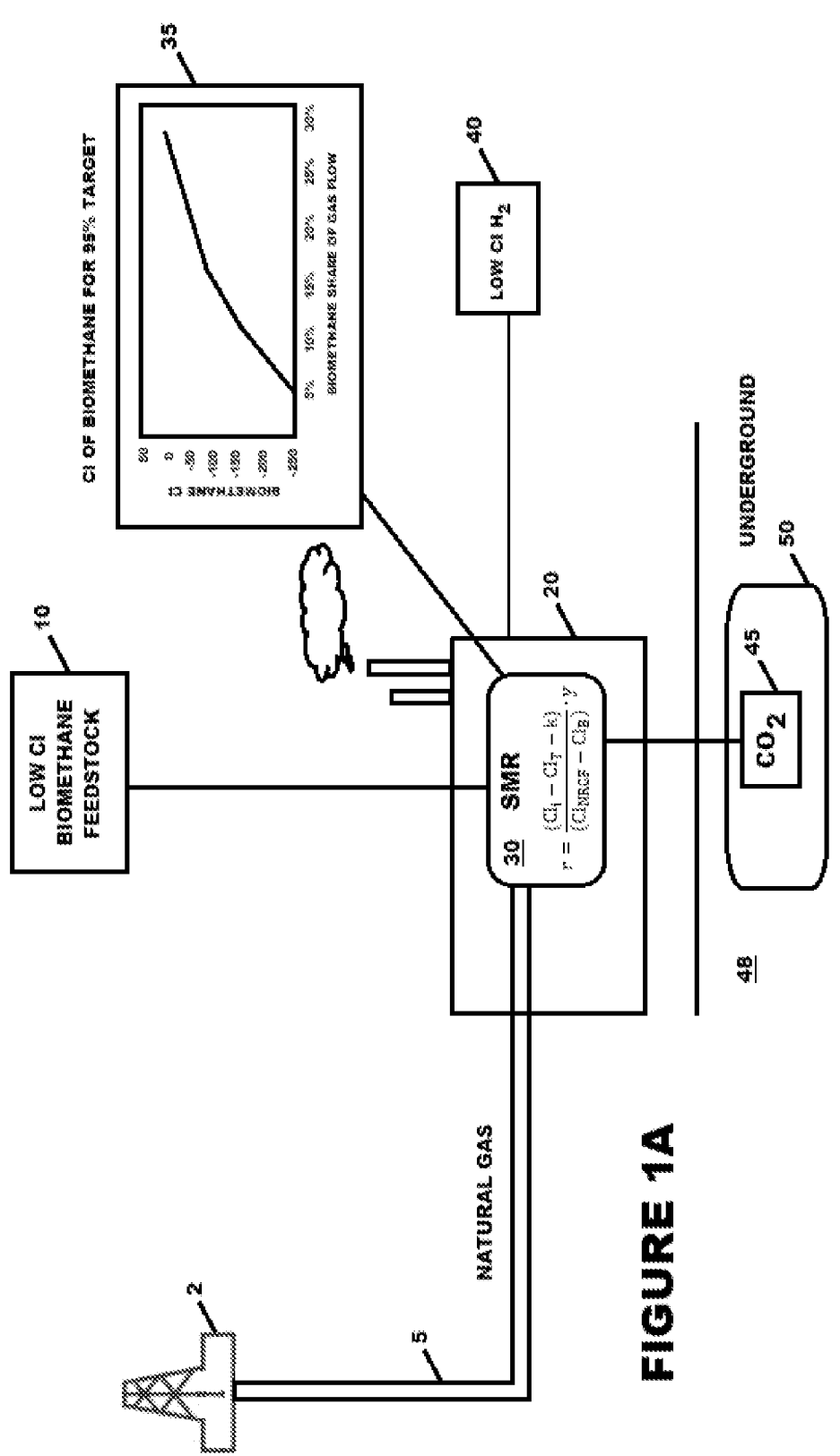
FIG. 1A describes an embodiment of a process for producing low carbon intensity (CI) hydrogen comprising replacing a fraction r of natural gas with a biomethane feedstock in steam methane reforming (SMR) in a hydrogen production facility that is part of an oil refinery.

The process(es) and/or system(s) of the present disclosure use a biomethane feedstock derived in some embodiments from biogas produced from biomass. Biomass refers to organic material originating from plants, animals, or microorganisms (e.g., including plants, agricultural crops or residues, municipal wastes, animal wastes and algae). Biomass is a renewable resource, which can be naturally replenished on a human timescale, and which can be used to produce bioenergy and/or biofuels (e.g., biogas). Some examples of suitable biomass may include: (i) energy crops (e.g., switchgrass, sorghum, and the like); (ii) residues, byproducts, or waste from the processing of plant material in a facility, or feedstock derived therefrom (e.g., sugarcane bagasse, sugarcane tops/leaves, corn stover, etc.); (iii) agricultural residues (e.g., wheat straw, corn cobs, barley straw, corn stover, etc.); (iv) forestry material; (v) livestock manure, including swine and cow manure; (vi) food scraps, and/or (vii) municipal waste or components removed or derived from municipal waste. These examples of suitable biomass are advantageous in that they do not compete with food production. The use of forestry or agricultural feedstocks (e.g., energy crops, residues, by products, or waste from the processing of plant material in a facility, or feedstock derived therefrom, or agricultural residues) may be advantageous for reducing GHG emissions. The use of livestock manure, such as swine or cattle manure, is particularly advantageous in terms of reducing the lifecycle GHG emissions of the hydrogen, or fuel, fuel intermediate, or chemical production produced using the hydrogen. In certain embodiments, the biomass is a fibrous biomass (e.g., straw).

The biomass is converted to the biogas using any suitable process or combination of processes. For example, the production process to produce biogas that is then, for example, upgraded partially or completely to produce the biomethane feedstock can include anaerobic digestion or gasification. The biogas thereby produced is a gas mixture that contains methane produced from biomass, among other components.

For purposes herein, "biomethane feedstock", means biogas, renewable natural gas, or methane from renewable sources. The biomethane feedstock may be partially upgraded biogas or obtained from biogas that is upgraded so that it at least meets pipeline specifications or may also be natural gas that is treated under applicable regulations as renewable or having environmental attributes or otherwise treated as being from renewable sources (e.g., provided from a natural gas distribution system). For purposes herein, "biomethane production process" refers to one or more processes that converts biomass to biomethane feedstock.

Anaerobic digestion refers to the biological breakdown of organic matter by anaerobic microorganisms and is typically conducted in anaerobic or low oxygen conditions and may involve a series of microorganism types and processes (e.g., hydrolysis, acidogenesis, acetogenesis, and methanogenesis). In general, the anaerobic digestion of biomass can be conducted in any suitable environment, including a natural environment (e.g., a landfill) or a controlled environment (e.g., one or more anaerobic digesters arranged in series and/or in parallel). Each anaerobic digester can be a holding tank, or another contained volume, such as a covered lagoon or sealed structure, configured to facilitate the anaerobic digestion and collection of biogas. Using a controlled environment facilitates the monitoring of input and output material flows, which can be used to determine how much biogas is produced from the anaerobic digestion of a certain amount of biomass, and/or which can be used to calculate lifecycle GHG emissions and/or validate compliance (e.g., with a pathway).

The biogas typically is a gas mixture that contains methane ($CH_4$) and carbon dioxide ($CO_2$), and may further comprise water ($H_2O$), nitrogen ($N_2$), hydrogen sulfide ($H_2S$), ammonia ($NH_3$), oxygen ($O_2$), volatile organic compounds (VOCs), and/or siloxanes, depending on the biomass from which it is produced. The gas mixture produced from anaerobic digestion often has a methane content between about 35% and about 75% (e.g., about 60%) and a carbon dioxide content between about 15% and about 65% (e.g., about 35%). The percentages used to quantify biogas composition and/or a specific gas content, as used herein, are expressed as mol %, unless otherwise specified. More specifically, they are expressed by mole fraction at standard temperature and pressure (STP), which is equivalent to volume fraction.

As noted, the biogas produced from anaerobic digestion or gasification is generally subjected to at least partial upgrading. Such upgrading refers to a process where the gas mixture (e.g., also referred to in the art as a "raw" or "crude" biogas, or simply "biogas") is treated to remove one or more components (e.g., $CO_2$, $N_2$, $H_2O$, $H_2S$, $O_2$, $NH_3$, VOCs, siloxanes, and/or particulates), wherein the treatment increases the calorific value of the gas mixture and produces a biomethane feedstock. For example, such upgrading typically includes removing carbon dioxide and/or nitrogen from the mixture. In general, such upgrading can be conducted using any suitable technology or combination of technologies known in the art. Such upgrading, which may be referred to as biogas upgrading or biomethane upgrading herein, and which is well-known to those of skill in the art, often includes one or any combination of absorption, adsorption, membrane separation, and cryogenic upgrading. As will be understood by those skilled in the art, the technology or combination of technologies utilized may be dependent on the composition of the gas mixture and/or how such mixture is produced. Since the gas mixture often has a significant carbon dioxide content, biogas upgrading often includes at least one system for separating methane from carbon dioxide. Without being limiting, the carbon dioxide can be removed from the gas mixture by one or any combination of absorption (e.g., water scrubbing, organic physical scrubbing, chemical scrubbing (e.g., amine)), adsorption (e.g., pressure swing adsorption (PSA), which includes vacuum PSA, or temperature swing adsorption), membrane separation (e.g., $CO_2$ selective membranes based on polyimide, polysulfone, cellulose acetate, polydimethylsiloxane), and cryogenic separation.

The biogas upgrading produces a biomethane feedstock that can be used to produce hydrogen in a hydrogen production facility.

Biomethane Feedstock Having Low Carbon Intensity (CI)

The biomethane feedstock used to produce hydrogen in a hydrogen production facility in some embodiments has a carbon intensity (CI) value within a range that is between 15 g $CO_2$eq/MJ and –500 g $CO_2$eq/MJ. The biomethane feedstock used to produce hydrogen in a hydrogen production facility in some embodiments has a CI value that is lower than 15 g $CO_2$eq/MJ, 20 g $CO_2$eq/MJ, or 25 g $CO_2$eq/MJ, or is within a range is between 25 g $CO_2$eq/MJ and –500 g $CO_2$eq/MJ, 25 g $CO_2$eq/MJ and –300 g $CO_2$eq/MJ, –50 g $CO_2$eq/MJ and –250 g $CO_2$eq/MJ, or –75 g$CO_2$eq/MJ and –250 g $CO_2$eq/MJ.

The term "carbon intensity" or "CI" refers to the quantity of lifecycle GHG emissions, per unit of fuel energy, and is often expressed in grams of $CO_2$ equivalent emissions per unit of fuel (e.g., g$CO_2$eq/MJ or g$CO_2$eq/MMBTU). As will be understood by those skilled in the art, lifecycle GHG emissions and/or carbon intensity are often determined using Lifecycle Analysis (LCA), which identifies and estimates all GHG emissions in producing a fuel or product, from the growing or extraction of raw materials, to the production of the fuel or product, through to the end use (e.g., well-to-wheel). Those skilled in the art will understand that lifecycle GHG emissions and/or carbon intensity values for a given fuel or product can be dependent upon the methodology used (e.g., as required by the applicable regulatory authority).

In general, any methodology can be used to determine carbon intensity and/or lifecycle GHG emissions. However, when the hydrogen and/or fuel/product produced using the hydrogen is specially treated for meeting a certain lifecycle GHG reduction threshold under certain regulations (e.g., is treated as clean or low carbon intensity hydrogen) and/or when the method includes obtaining one or more credits for the hydrogen and/or its production, and/or for fuel, fuel intermediate, or product produced from the hydrogen, or its production, the methodology will be selected to comply with the prevailing rules and regulations in the applicable jurisdiction (e.g., relevant to desired credits).

Methodologies for calculating carbon intensities and/or lifecycle GHG emissions according to various regulatory bodies are well known in the art and can be readily calculated by those of ordinary skill in the art. For example, in certain embodiments, the carbon intensities and/or lifecycle GHG emissions are determined using a LCA model, such as the GREET model. The GREET model, which is well-known by those skilled in the art, refers to "The Greenhouse gases, Regulated Emissions, and Energy use in Technologies Model" developed at Argonne National Laboratory (ANL) (e.g., greet.es.anl.gov). In certain embodiments, the carbon intensities and/or lifecycle GHG emissions are determined based on the fuel/product being produced according to a certain pathway (e.g., a fuel pathway). For example, in certain embodiments, the carbon intensities are pathway certified carbon intensities or are regulatory default value carbon intensities. In general, the term "fuel pathway" refers to a collective set of processes, operations, parameters, conditions, locations, and technologies throughout all stages that the applicable agency considers appropriate to account for in the system boundary of a complete analysis of that fuel's lifecycle greenhouse gas emissions. In some cases, a fuel pathway can be a specific combination of three components, namely: (1) feedstock, (2) production process, and (3) product or fuel type. In certain embodiments, the carbon intensities are regulatory default value carbon intensities. For example, in the UK, biomethane produced from wet manure may have a default carbon intensity of 22 $gCO_2eq/$ MJ when the digestate is fed to an open enclosure, and when the off-gas from biogas upgrading is not combusted, or may have a default carbon intensity of −100 $gCO_2eq/MJ$ when the digestate is fed to closed enclosure, and when the off-gas from biogas upgrading is combusted. In certain embodiments, the carbon intensities (e.g., of the biomethane feedstock) are determined using disaggregated default values (e.g., associated with certain feedstocks and/or steps in a supply chain) or a mixture of disaggregated default values and measured values (e.g., based on supply chain specific measured values). In certain embodiments, the carbon intensities (e.g., of the biomethane feedstock) are determined (e.g., using an LCA) and then verified by the regulatory agency (e.g., the fuel pathway and/or corresponding carbon intensities can be approved by the regulatory agency) and/or by a verification body approved and/or appointed by the regulatory agency.

As noted above, any methodology can be used to determine the CI's (e.g., $CI_i$, $CI_T$, $CI_{NRGF}$, $CI_B$) and/or carbon emissions (e.g., k) in Equation A, so long as the same methodology is used for all. However, as further noted previously, in those embodiments in which the biomethane feedstock has a carbon intensity (CI) value within a designated range, e.g., that is between 15 g $CO_2eq/MJ$ and −500 g $CO_2eq/MJ$, the GREET model is used to measure CI for purposes of determining whether the CI of the biomethane feedstock is within such designated range, regardless of what model is used to calculate $CI_i$, $CI_T$, $CI_{NRGF}$, $CI_B$ in the Equation A. In some embodiments, when the prevailing methodology which is used to determine $CI_i$, $CI_T$, $CI_{NRGF}$, $CI_B$ in the Equation A is not the GREET model, then the methodology for determining whether the CI of the biomethane feedstock is within a specified range will be different that the methodology used to calculate $CI_B$ in the Equation A.

In certain embodiments herein, such biomethane feedstock having the foregoing CI range is referred to as a "low CI biomethane feedstock". The CI value of such biomethane feedstock is obtained at least in part by one or any combination of:

(a) capturing and sequestering carbon dioxide generated from an anaerobic digestion that formed the biomethane feedstock;

(b) capturing and sequestering carbon from a residue of the anaerobic digestion that formed the biomethane feedstock;

(c) using a renewable energy source to power a production process for producing or upgrading the biomethane feedstock; and/or (d) processing animal waste and avoiding emissions of methane to atmosphere that would otherwise have been released without production and collection of the biomethane feedstock.

It should be understood that the CI value of the low CI biomethane feedstock may be only partially attributed to any one of the foregoing methods to reduce CI. That is, additional steps/measures not specifically set forth above can contribute to a low CI, as would be understood by those skilled in the art. In addition, any combination of the above methods or measures to reduce CI of the biomethane feedstock can be used to achieve a desired CI associated with the biomethane feedstock. Embodiments of each of the foregoing methods are described in more detail below.

(a) Carbon Dioxide Capture and Sequestration

Capturing and sequestering carbon dioxide generated from an anaerobic digestion that formed the biogas that is at least partially upgraded to biomethane feedstock comprises obtaining carbon dioxide, typically from a step of upgrading the biogas as described above. As discussed, the biogas produced from anaerobic digestion may have a methane content (mol %) between about 35% and about 75% (e.g., about 60%) and a carbon dioxide content between about 15% and about 65% (e.g., about 35%). The carbon dioxide can be captured from the biogas using one or more of the techniques described above in connection with biogas upgrading. The term "captured" is used herein in a non-limiting sense and includes any method, process and/or technique for obtaining carbon dioxide from a mixture of gases comprising methane (e.g., biogas), including but not limited to those methods and processes described in connection with biogas upgrading.

The carbon dioxide thus captured from biogas upgrading is sequestered. This includes any methodology for sequestration of carbon dioxide, including any storage (e.g., underground), that is carried out so that most or all of the carbon dioxide is prevented from entering the atmosphere or in which entry to atmosphere thereof is delayed. The carbon dioxide may be introduced underground in a geological formation, such as an underground reservoir that sequesters the carbon dioxide. In some non-limiting embodiments, measures may be taken to reduce leakage of carbon dioxide from the geological formation. In another non-limiting example, the carbon dioxide is sequestered in concrete by its introduction to a concrete manufacturing process using known methods. In another non-limiting example, the carbon dioxide is sequestered as a result of its use in enhanced oil recovery (EOR) or for the production of one or more products (e.g., plastics). Sequestration of carbon dioxide often includes compressing the captured carbon dioxide (e.g., to produce liquid carbon dioxide or for injection into a carbon dioxide distribution system) and transporting the captured carbon dioxide for sequestration (e.g., by vehicle and/or a carbon dioxide distribution system). As will be understood by those skilled in the art, it can be advantageous to sequester the captured carbon dioxide using a method recognized by the applicable regulatory authority for reducing GHG emissions and/or mitigating climate change. In certain embodiments, the carbon dioxide is provided for sequestration by transporting it (e.g., by pipeline or vehicle) to a carbon capture and sequestration hub or site.

(b) Capturing and Storing Carbon from Residue

In addition to producing the biomethane feedstock, the biomethane production process may produce residue that is not converted to the biomethane feedstock. Such residue comprises carbon and thus providing it, and/or material derived therefrom, for use in carbon capture and sequestration may also reduce the CI of the biomethane feedstock. The term "providing", as used herein with respect to an element, refers to directly or indirectly obtaining the element and/or making the element available for use.

In some embodiments, the residue is a digestate from anaerobic digestion. Digestate refers to the material remaining after one or more stages of the anaerobic digestion (e.g., the term may refer to acidogenic digestate, methanogenic digestate, or a combination thereof). Digestate can include any organic material not digested by the anaerobic microorganisms, byproducts of the anaerobic digestion released by the microorganisms, and/or the microorganisms themselves. For example, the digestate can include carbohydrates, nutrients (such as nitrogen compounds and phosphates), other organics, and/or wild yeasts. The composition of digestate can vary depending on the biomass from which it is derived. Digestate in some embodiments has both a solid and liquid component. Thus, the residue can be in the form of solid, liquid or semi-solid material. A common use of digestate is as a soil conditioner, where it can provide nutrients for plant growth and/or displace the use of fossil-based fertilizers. In certain embodiments of the disclosure, the digestate is processed to provide carbon-containing material that that can be sequestered as part of a carbon capture and sequestration. In general, one or more types of carbon-containing material containing and/or derived from at least part of the residue may be sequestered.

In certain embodiments of the disclosure, the carbon-containing material is sequestered as a liquid, semi-solid and/or solid material derived from (i.e., obtained from or produced from) a part of the biomass not converted to bioenergy. In certain embodiments, the carbon-containing material is not biodegradable under the storage conditions. In certain embodiments, the sequestration is selected such that if the carbon-containing material does degrade, that carbon dioxide released from the degradation is trapped.

In certain embodiments of the disclosure, the residue is a carbon-containing material, such as biochar. Biochar, which can be produced from gasification and/or pyrolysis of the biomass, can be recycled within the gasification and/or pyrolysis processes (e.g., to provide additional fuel for the process). Alternatively, biochar, which is biologically unavailable, can be provided as a soil amendment where it can sequester the carbon in the soil for prolonged periods of time, such as for centuries. In certain embodiments of the disclosure, the carbon sequestration includes providing biochar as a soil amendment (e.g., instead of recycling it within the process), or includes subjecting a carbon-containing material derived from the biomass and not converted to bioenergy (e.g., a portion of the digestate) to gasification and/or pyrolysis, and providing the biochar produced therefrom for soil amendment, for carbon capture and sequestration, and/or some other external use. Advantageous, such process may also produce additional bioenergy from the biomass (e.g., fuel and/or electricity). In certain embodiments, the heat and/or electricity generated from gasification and/or pyrolysis of a byproduct is used within the process (e.g., in the biomethane production process) in order to maintain the carbon intensity of the biomethane, renewable hydrogen, and/or fuel produced therefrom below a certain limit (e.g., below 20, 10 or 0 $gCO_2eq/MJ$).

In certain embodiments of the disclosure, the carbon sequestration includes storing carbon in a product. In this case, a carbon-containing material derived from the biomass and not converted to bioenergy is used to produce a product that makes the carbon unavailable for biodegradation (e.g., can be provided in products that provide continued sequestration benefits, such as building materials).

In certain embodiments of the disclosure, the sequestration includes sequestering liquid, semi-solid and/or solid carbon-containing material derived from the residue. In some embodiments, the material is sequestered indefinitely in a subsurface formation. For example, the digestate can be subjected to a hydrothermal liquefaction to provide a bio-oil that can be sequestered. The pyrolysis of biomass, which can be part of the biomethane production process, can also produce pyrolysis oil, which can be sequestered. In some cases, the sequestration method is selected to prevent biodegradation of the material and/or trap GHGs in the event of biodegradation. In some embodiments, the material is treated in a process to reduce the potential for biodegradation. Sequestering a liquid carbon-containing material derived from the biomass may be advantageous in that injection into the storage area may be feasible and/or there may be fewer concerns related to leakage (i.e., relative to carbon dioxide sequestration).

(c) Using a Renewable Energy Source or Low-Carbon Electricity to at Least Partially Power the Biomethane Production Process In certain embodiments of the disclosure, energy for the biomethane production process is generated using a renewable energy source, such as low-carbon electricity. Low-carbon electricity refers to electricity generated in a process that does not emit significant amounts of fossil-based carbon dioxide and/or is produced from renewable energy sources. Without being limiting, low-carbon electricity can include electricity produced using nuclear power, hydropower, solar power, wind power, geothermal power, wave power, tidal power, or electricity produced from the combustion of a low-carbon energy source (e.g., biomass, biogenic syngas, or hydrogen) or of a fossil-based energy source with carbon capture and sequestration (CCS). In certain embodiments of the instant disclosure, heat required for the biogas upgrading is generated using renewable electricity (i.e., electricity produced using renewable energy sources such as hydropower, solar power, wind power, geothermal power, wave power, tidal power, etc.). In certain embodiments, the low-carbon electricity is generated from gasification of agricultural and/or solid waste.

In some embodiments, biogas that is at least partially upgraded can be used to generate electricity for the biomethane production process. For example, a portion of the low CI biomethane feedstock may be recycled to the biogas upgrading to generate electricity for the biogas upgrading. A non-limiting example is depicted in FIG. 2C hereinafter.

In general, the CI of a biomethane feedstock can be reduced as a result of using low-carbon electricity in any of one or more points of the biomethane production process (e.g., reduced relative to using electricity generated from fossil fuels). For example, low-carbon electricity can be used at any point in the anaerobic digestion and/or biogas upgrading.

In certain embodiments, the low-carbon electricity is used for one or more pumps and/or compressors, for stirring, and/or for heating in the anaerobic digestion. For example, manure-based feedstock is often pumped as a slurry into one or more anaerobic digesters, which are at least periodically stirred throughout the anaerobic digestion, and which are often heated to maintain a suitable temperature (i.e., suitable for facilitating anaerobic digestion).

In certain embodiments, the low-carbon electricity is used for one or more pumps and/or compressors used in the biomethane production process. For example, biogas is often compressed prior to and/or in intermediate stages of membrane separations, PSA separations, and absorption separations. In addition, the biomethane feedstock produced may be compressed for transport to the hydrogen production (e.g., compressed to pipeline pressure and/or for transport in compressed natural gas (CNG) trailers).

(d) Processing Animal Waste and/or Food Waste and Avoiding Emissions of Methane

In certain embodiments, when the biomass is animal waste, methane emissions from such animal waste may be captured rather than allowed to enter the atmosphere. For example, in swine or dairy operations, manure is often sent to a pit or other containment area and methane emitted therefrom (among other gases) enters the atmosphere. Methane may also enter the atmosphere at other stages of an animal waste management process, including the spreading of manure on fields to fertilize crops.

In certain embodiments, the animal waste is sent to an anaerobic digestion from which biogas is collected. The closed or substantially closed environment of the anaerobic digester or digesters aids in a reduction of biomethane emissions that would otherwise be emitted to the atmosphere. Such containment may also aid in the reduction of NOx emissions to atmosphere, among other volatile gases produced from the animal waste. Any suitable method for collecting the biomethane may be employed, including a partially contained area to collect the methane. The animal waste may originate from one or any combination of different sources, including slaughterhouse waste, restaurant waste containing animal products, manure from a variety of farming operations, including but not limited to waste from dairy operations, feedlots for raising beef or dairy cattle for meat production, chicken waste, hog waste or any combination thereof. In certain embodiments, the biomass is dairy and/or swine manure.

In certain embodiments, the animal waste, such as manure, has a suitable consistency such that it can be pumped to facilitate its introduction to one or more anaerobic digestors. The manure may be stored in a closed pit or other containment means prior to collection of the biomethane feedstock.

An operation that produces animal waste may introduce the biomethane feedstock produced and collected from the animal waste to a pipeline (after suitable upgrading), such as a natural gas pipeline or otherwise transport the biomethane feedstock off-site. In another embodiment, part of the biomethane feedstock is used on-site, such as but not limited to producing electricity and/or heat for a farming or other operation. For example, without being limiting, at least part of the biomethane feedstock may be used in a combined heat and power (CHP) engine or otherwise used to generate electricity for use in the operation. In another embodiment, at least part of the biomethane feedstock is used both on-site and sent off-site for other uses, such as to heat homes or to make fuel therefrom.

In certain embodiments, waste other than animal waste is processed, and methane emissions from such waste are captured rather than allowed to enter the atmosphere. For example, in certain embodiments food waste (e.g., source separated organics) is subjected to anaerobic digestion in a production process that produces the biomethane feedstock.

Advantageously, diverting the food waste from a landfill, where methane (among other gases) may be emitted and released to the atmosphere, and/or collecting biogas produced from the anaerobic digestion of the food waste, may qualify the biomethane feedstock and/or fuel, fuel intermediate, or product produced therefrom for incentives associated with avoided emissions of methane (e.g., a reduced carbon intensity, or incentives associated therewith) under certain government programs.

Hydrogen Production

The biomethane feedstock is provided at a hydrogen production facility and is used to replace a fraction of a non-renewable gaseous feedstock. The "hydrogen production facility" as used herein includes any unit operation(s) that makes hydrogen regardless of its location or proximity to another facility or unit operation(s) that uses such hydrogen produced in such facility. The hydrogen produced in such facility can be purified therein or sent to another unit operation(s) or process that removes unwanted components therefrom. Without limitation, the hydrogen production facility includes any unit operation or operations within or in proximity to another facility or plant, such as an oil refinery or an ammonia or fertilizer production plant, or the like, or a stand-alone facility that produces hydrogen as a product or as an intermediate to make another product, including a fuel. Additional examples are readily conceivable by those of skill in the art and accordingly the term is not to be construed as limited to the examples described herein or any particular type of hydrogen production facility.

The hydrogen production facility uses a non-renewable gaseous feedstock and a fraction of the non-renewable gaseous feedstock is replaced by the biomethane feedstock. This includes replacement of a fraction of the non-renewable gaseous feedstock with methane that is considered renewable by regulators as described above and thus considered a biomethane feedstock as used herein.

In general, the hydrogen production in the hydrogen production facility can use any suitable technology known in the art that can convert the biomethane feedstock and/or non-renewable gas feedstock (e.g., natural gas) to hydrogen. Examples of technologies that may be suitable include, but are not limited to, steam methane reforming (SMR), autothermal reforming (ATR), partial oxidation (POX), and dry methane reforming (DMR). SMR, ATR, and DMR, which are types of catalytic reforming, may operate by exposing natural gas to a catalyst at high temperature and pressure to produce syngas. POX reactions, which include thermal partial oxidation reactions (TPOX) and catalytic partial oxidation reactions (CPOX), may occur when a sub-stoichiometric fuel-oxygen mixture is partially combusted in a reformer. POX also may be referred to as oxidative reforming. For purposes herein, the term "methane reforming" may refer to SMR, ATR, DMR, or POX. Methane reforming is well known in art and, of the various types of methane reforming, SMR is the most common.

The syngas produced from methane reforming may be further reacted in a water gas shift (WGS) reaction, wherein carbon monoxide is converted to carbon dioxide and hydrogen:

$$CO + H_2O \rightarrow CO_2 + H_2 + \text{small amount of heat}$$

Although optional, providing a WGS downstream of methane reforming increases the yield of $H_2$, and thus is commonly included in hydrogen production. When included, the WGS is considered to be part of the methane reforming herein. The syngas produced from methane reforming often includes hydrogen, methane, carbon monoxide, carbon dioxide and water vapour. As will be understood by those skilled in the art, methane reforming can be conducted using one or more reactors. For example, the WGS can be conducted using a high temperature WGS reactor followed by a low temperature WGS reactor.

In certain embodiments, the carbon dioxide produced from the hydrogen production is sequestered as part of CCS. The carbon dioxide can be captured from the syngas (e.g., using vacuum pressure swing adsorption (VPSA) or an absorption amine unit) and/or from a flue gas (e.g., using an activated amine process). Without being limiting in any way, in some embodiments, it may be more technically and/or economically more feasible to capture the carbon dioxide from the syngas, or a stream derived therefrom (e.g., off gas from hydrogen purification), as the flue gas may have a relatively low carbon dioxide concentration (e.g., relatively low partial pressure), may be at a lower pressure (e.g., atmospheric), and/or may be contaminated with nitrogen.

In certain embodiments, renewable power is used to at least partially power the hydrogen production. For example, renewable power can be used to provide at least some of the heat for methane reforming, for producing steam, for hydrogen purification, and/or for compression of the hydrogen product.

Replacing a Fraction of Non-Renewable Gaseous Feedstock with the Biomethane Feedstock The non-renewable gaseous feedstock replaced at the hydrogen production facility is feedstock that is (a) fed to methane reforming; and/or (b) used to generate heat for reforming in the hydrogen production. The non-renewable gaseous feedstock may be natural gas, refinery gas, liquid petroleum gas (LPG), light naphtha, heavy naphtha and straight-run naphtha or any other suitable non-renewable feedstock used in hydrogen production facilities known to those of skill in the art. In certain embodiments, the non-renewable gaseous feedstock that is replaced is natural gas.

The biomethane feedstock may be used to replace any non-renewable gaseous feedstock fed to methane reforming, including but not limited to any reforming process comprising SMR, ATR, and DMR as described previously.

The biomethane feedstock may be alternatively or additionally used to replace a fraction r of any non-renewable feedstock used to generate heat for reforming. This can include replacing a non-renewable gaseous feedstock combusted in reformer burners. In one non-limiting example, a combustion chamber may surround the reformer tubes that contains the catalyst and in which the reforming reaction is conducted. For example, in steam methane reforming, a preheated feed stream of the non-renewable gaseous feedstock may be fed, along with steam, into reactor tubes for the methane reforming, which contain a reforming catalyst. Streams of natural gas and combustion air may be fed into the reformer burners, which provide the heat (e.g., required for an endothermic reforming reaction). The syngas produced from the methane reforming may be fed to WGS to produce more hydrogen. In some embodiments, the feed can include natural gas in addition to biomethane feedstock when the biomethane feedstock is used to replace a fraction of the natural gas as described hereinafter. The reformers may be characterized by the location of the burners within the combustion chamber (e.g., side-fired, top-fired, bottom-fired). As a skilled addressee would appreciate, such fired burners are commonly used in hydrogen production that includes steam methane reforming. Replacing a fraction of the non-renewable gaseous feedstock with biomethane feedstock can be based on allocating the biomethane feedstock and/or physically directing it (e.g., feeding biomethane feedstock into the SMR tubes and/or the SMR burners).

In certain embodiments, heat required for the reforming is at least partially provided by direct electrical resistance, inductive heating or by using a heat storage medium. As would be appreciated by those of skill in the art, various methods can be used to provide heat to reforming and biomethane feedstock can be used directly or indirectly to replace any non-renewable gaseous feedstock used in such heating processes.

In certain embodiments, the fraction of non-renewable gaseous feedstock replaced by the biomethane feedstock is defined by r, which is determined by Equation A below:

$$r = \frac{(CI_i - CI_T - k - C_r)}{(CI_{NRGF} - CI_B)} \cdot y, \qquad \text{Equation A}$$

wherein the CI values of Equation A are in g $CO_2$eq/MJ.

The $CI_i$ is a calculated carbon intensity of the hydrogen produced by reforming assuming only the use of a non-renewable gaseous feedstock in the absence of carbon capture and sequestration and without using renewable power for the hydrogen production. In such a process, only non-renewable gaseous feedstock is assumed to be used in reforming (i.e., without replacement by the biomethane).

The $CI_T$ is the target carbon intensity of the hydrogen to be produced in the hydrogen production facility. The target carbon intensity $CI_T$ may correspond to or be set in accordance with achieving some predetermined carbon intensity threshold (e.g., under which it is treated as clean or low carbon hydrogen) and/or may correspond to or be set in accordance with achieving a carbon intensity associated with a predetermined lifecycle GHG reduction (e.g., a value set by regulations or otherwise measured relative to $CI_i$, (CI−k), (CI$_i$−k−C$_r$) and/or to a baseline value (e.g. a fossil baseline) as determined by applicable regulations).

In certain embodiments, the target carbon intensity $CI_T$ is a predetermined carbon intensity threshold. For example, in some embodiments, the target carbon intensity is a carbon intensity determined using GREET that is less than or equal to about 60 gCO$_2$eq/MJ, less than or equal to about 50 gCO$_2$eq/MJ, less than or equal to about 40 gCO$_2$eq/MJ, less than or equal to about 30 gCO$_2$eq/MJ, less than or equal to about 20 gCO$_2$eq/MJ, less than or equal to about 15 gCO$_2$eq/MJ, less than or equal to about 10 gCO$_2$eq/MJ, less than or equal to about 8 gCO$_2$eq/MJ, less than or equal to about 6 gCO$_2$eq/MJ, less than or equal to about 5 gCO$_2$eq/MJ, less than or equal to about 4 gCO$_2$eq/MJ, less than or equal to about 2 gCO$_2$eq/MJ, or less than or equal to about 0 gCO$_2$eq/MJ. For example, it may be advantageous to meet a target carbon intensity of 0 (i.e., a carbon intensity that is equal to or less than zero) as it can produce zero-emission hydrogen or hydrogen having a negative carbon intensity. In some embodiments, the target carbon intensity is a carbon intensity determined using GREET that is less than or equal to about −10 gCO$_2$eq/MJ, less than or equal to about −20 gCO$_2$eq/MJ, or less than or equal to about −30 gCO$_2$eq/MJ.

In some embodiments, the target carbon intensity $CI_T$ is a carbon intensity that reflects a certain lifecycle GHG reduction (e.g., measured relative to $CI_i$−k−C$_r$, or to a baseline value (e.g., a fossil baseline)). For example, in some embodiments, the target carbon intensity is a carbon intensity that reflects a lifecycle GHG reduction that is at least about 40%, at least about 50%, at least about 60%, at least about 70%, at least about 80%, at least about 90%, or at least about 95% relative to $CI_i$. In some embodiments, the target carbon intensity is a carbon intensity that reflects a lifecycle GHG reduction that is at least about 40%, at least about 50%, at least about 60%, at least about 70%, at least about 80%, at least about 90%, or at least about 95% relative to $CI_i$−k−C$_r$. For example, the initial $CI_i$ may be between about 80 gCO$_2$eq/MJ and about 130 gCO$_2$eq/MJ, depending upon the hydrogen production and/or methodology used to calculate carbon intensity. For a lifecycle GHG reduction that corresponds to 70% relative to CI$_i$, the corresponding CI$_T$ would be between about 24 gCO$_2$eq/MJ and about 39 gCO$_2$eq/MJ. If the hydrogen production includes carbon capture and sequestration, where k=60 gCO$_2$eq/MJ, but does not use renewable power for the hydrogen production, then for a lifecycle GHG reduction that corresponds to 70% relative to CI$_i$-k-C$_r$, the corresponding CI$_T$ would be between about 6 gCO$_2$eq/MJ and about 21 gCO$_2$eq/MJ.

In some embodiments, the low CI H$_2$ and/or its production is associated with at least a 70% reduction in carbon emissions relative to the hydrogen production facility using only the non-renewable gaseous feedstock. In such embodiments, the at least 70% reduction in carbon emissions is measured relative to CI$_i$ and in which k or C$_r$ (defined above in Equation A and described below) emission savings are subtracted if carbon capture and sequestration and/or renewable power are used in the hydrogen production facility (k and C$_r$ are zero when neither are used) (i.e., percent reduction is measured relative to CI$_i$-k-C$_r$).

In some embodiments, the target carbon intensity is a carbon intensity that reflects a lifecycle GHG reduction that is at least about 40%, at least about 50%, at least about 60%, at least about 70%, at least about 80%, at least about 90%, or at least about 95% relative to a fossil baseline set by regulators. With regard to the latter, consider the case where the fossil comparator for hydrogen production is 94 gCO$_2$eq/MJ. When the goal is to achieve a 95% GHG reduction, the target CI may be about 4.7 gCO$_2$eq/MJ. However, other CI$_T$ targets may be encompassed within the scope of the disclosure as well.

In certain embodiments, the hydrogen production and/or the hydrogen itself is associated with a lifecycle GHG reduction corresponding to at least 60%, at least 70%, at least 80%, at least 90%, or at least 95%, relative to a baseline value set by regulators (e.g., a fossil baseline corresponding to the production of hydrogen by steam methane reforming non-renewable natural gas). Such embodiments may be advantageous because under certain government programs tax benefits may be tied to the level of GHG reductions relative to a fossil hydrogen baseline.

The k of Equation A is the net amount of carbon dioxide captured and sequestered per unit of hydrogen produced in g CO$_2$eq/MJ associated with hydrogen production. As noted above, the carbon dioxide is a byproduct of SMR and can be captured, purified, and/or transported for being introduced and sequestered (e.g., underground). The net amount accounts for both the amount of carbon dioxide captured and sequestered and the amount of carbon dioxide emitted as a result of the carbon capture and sequestration. It will be noted that k is zero when no carbon dioxide is captured and sequestered.

The C$_r$ of Equation A is carbon dioxide emissions reduction per unit of hydrogen produced in g CO$_2$eq/MJ attributable to using renewable power in or associated with hydrogen production. It will be noted that C$_r$ is zero when no renewable power is used in hydrogen production.

The CI$_{NRGF}$ is the carbon intensity of the non-renewable gaseous feedstock (NRGF) fed to the hydrogen production facility. For example, this may be the non-renewable gaseous feedstock fed to the SMR and/or used to generate heat for the SMR as described above.

The CI$_B$ is the carbon intensity of biomethane feedstock fed to the hydrogen production facility.

The y of Equation A is a ratio of energy of the hydrogen produced in MJ to energy of the non-renewable gaseous feedstock and the biomethane feedstock in MJ.

The CI values are calculated based on prevailing rules and regulations. A non-limiting example of a calculation of r using Equation A is provided in Example 2 hereinafter.

As discussed herein, the term "r", refers to the fraction of non-renewable gaseous feedstock replaced by the biomethane feedstock. More specifically, it refers to the energy of biomethane feedstock provided (e.g., in MJ) to produce a given quantity of hydrogen divided by the total energy of the feedstock provided (i.e., MJ of biomethane feedstock and MJ of non-renewable gaseous feedstock) to produce the given quantity of hydrogen. The fraction of non-renewable gaseous feedstock replaced by the biomethane feedstock corresponds to the biomethane share of gas flow. The biomethane share of gas flow, which is calculated on an energy basis, and which may be expressed as a percentage, refers to the fraction/percentage of the total energy of gaseous feedstock provided for hydrogen production that is associated with biomethane feedstock. The terms share and/or fraction do not imply that the biomethane and non-renewable gaseous feedstock are provided simultaneously, but rather refers to the share and/or fraction of the total energy provided over a given time period. For example, a batch of biomethane may be sourced and allocated to a fraction of the feedstock used to produce the quantity of hydrogen.

In certain embodiments, the fraction of non-renewable gaseous feedstock replaced by the biomethane feedstock is equal to or greater than r, where r is determined by Equation A below, and is less than or equal to 50% (e.g., less than 45%, 30%, or 25%).

$$r = \frac{(CI_i - CI_T - k - C_r)}{(CI_{NRGF} - CI_B)} \cdot y, \qquad \text{Equation A}$$

wherein the CI values of Equation A are in g CO$_2$eq/MJ. It is remarkable that the fraction of the non-renewable gaseous feedstock replaced by the biomethane feedstock can be within this relatively small range, and in particular, be less than or equal to 25%, 30%, 45%, or 50%, and that the resulting hydrogen and/or its production can be associated with at least a 70% reduction in carbon emissions relative to the hydrogen production using only the non-renewable gaseous feedstock (i.e., relative to CI$_i$-k-C$_r$).

Use of Hydrogen Produced in the Hydrogen Production Facility

In certain embodiments of the disclosure, the hydrogen is used in the hydroprocessing (e.g., hydrocracking and/or hydrotreating) of crude-oil derived liquid hydrocarbon such that the hydrogen (i.e., at least the renewable hydrogen) is incorporated into a crude-oil derived liquid hydrocarbon to produce, for example, gasoline, diesel, and/or jet fuel having renewable content (e.g., see U.S. Pat. Nos. 8,658,026, 8,753, 854, 8,945,373, 9,040,271, 10,093,540, 10,421,663 10,723, 621 and 10,981,784, which are incorporated herein by reference). The term "crude oil derived liquid hydrocarbon", as used herein, refers to any carbon-containing material obtained and/or derived from crude oil that is liquid at standard ambient temperature and pressure. The term "crude oil", as used herein, refers to petroleum extracted from geological formations (e.g., in its unrefined form). Crude oil includes liquid, gaseous, and/or solid carbon-containing material from geological formations, including oil reservoirs, such as hydrocarbons found within rock formations, oil sands, or oil shale. The term "renewable content", as used herein, refers to the portion of the fuel(s) that is recognized and/or is treated as renewable (e.g., a biofuel) under applicable regulations. As will be understood by those skilled in the art, the quantification of the renewable content can be determined using any suitable method and is typically dependent upon the applicable regulations.

In certain embodiments, the hydrogen is used to produce ammonia in a Haber-Bosch process. In the Haber-Bosch process, which is well-known to those skilled in the art, nitrogen is converted to ammonia according to the following reaction:

$$N_2 + 3H_2 \rightarrow 2NH_3$$

The reaction is conducted under high temperatures and pressures with a metal catalyst. Ammonia has an important role in the agricultural industry for production of fertilizers. Ammonia may also be used as an energy carrier for energy storage and transportation.

In certain embodiments of the disclosure, the hydrogen is provided as a product (e.g., for use in a fuel cell or a fuel). For example, the hydrogen can be used for transportation purposes, for generating electricity, and/or for use in district heating.

In certain embodiments of the disclosure, the hydrogen is provided as feedstock in a production process that produces a fuel, fuel intermediate, chemical product, or any combination thereof. A fuel refers to a material (e.g., solid, liquid, or gaseous), which may contain carbon, that can be combusted to produce power or heat (e.g., may be a transportation or heating fuel). A fuel intermediate is a precursor used to produce a fuel by a further conversion process, such as by a biologic conversion, a chemical conversion, or a combination thereof. A chemical product refers to a chemical compound used in a production process or a product such as a commodity. An example of a chemical product produced from hydrogen is fertilizer.

In certain embodiments of the disclosure, the hydrogen is provided as feedstock to produce a fuel selected from long-haul trucking fuel (e.g., diesel), shipping fuel (e.g., heavy fuel oil), aviation fuel (e.g., kerosene, jet fuel) or district heating fuel. In certain embodiments of the disclosure, the hydrogen is provided as feedstock to produce fuels or chemical products such as ammonia or fertilizer.

In certain embodiments of the disclosure, the hydrogen is used to produce one or more alcohols via gas fermentation using known processes. In gas fermentation, which is well-known to those skilled in the art, a gas mixture typically containing hydrogen with carbon dioxide and/or carbon monoxide is fed into a fermentation tank. In this embodiment, the carbon monoxide in the syngas functions as a substrate for the biologic conversion, which utilizes microorganisms or other biocatalysts. For example, acetogenic microorganisms can be used to produce a fermentation product from carbon monoxide. The production of ethanol by the acetogenic microorganisms proceeds through a series of biochemical reactions.

In certain embodiments of the disclosure, the hydrogen is used to produce methanol. For example, methanol can be produced by directly hydrogenating pure carbon dioxide with hydrogen with Cu/ZnO-based catalysts. Alternatively, hydrogen can be used to produce methanol according to the following reactions:

$$CO_2 + H_2 \rightarrow CO + H_2O \text{(reverse water gas shift)}$$

$$CO + 2H_2 \rightarrow CH_3OH$$

The methanol can be used as a fuel (e.g., mixed with gasoline) or can be used to produce a fuel (e.g., biodiesel).

In certain embodiments of the disclosure, the hydrogen is used to produce gasoline, diesel, or waxes using the Fischer-Tropsch process. The Fischer-Tropsch process refers to a collection of chemical reactions that converts syngas into liquid hydrocarbons, typically in the presence of metal catalysts under elevated pressures and temperatures. The Fischer-Tropsch process is well known. In the embodiments including a Fischer-Tropsch process, the hydrogen may be used to supplement another gas feed containing carbon monoxide and/or carbon dioxide in order to provide the required $H_2$:CO (e.g., about 2).

While producing a hydrogen product, and in particular a renewable hydrogen product, is advantageous, it is particularly advantageous when the renewable hydrogen is used as feedstock for a production process (e.g., to produce a fuel, fuel intermediate, or chemical product). It can be particularly advantageous when the renewable hydrogen is used as feedstock for producing a transportation fuel. Using the renewable hydrogen in a production process can reduce GHG emissions associated with production process, and when the production process produces a fuel, can impart renewable content to the fuel and/or reduce the carbon intensity of the fuel. The GHG reductions can be significant, particularly when the renewable hydrogen has a negative carbon intensity. It can be particularly advantageous to use the renewable hydrogen in the production of ammonia and/or fertilizer, as reducing the amount of carbon dioxide produced during ammonia manufacturing may significantly contribute to achieving net-zero targets.

Obtaining Credits

In certain embodiments of the disclosure, the process includes generating, obtaining, or providing credits. Credits are used to incentivize renewable fuels, often in the transportation sector. For example, credits, such as fuel credits, can be used to demonstrate compliance with some government initiative, standard, and/or program, where the goal is to reduce GHG emissions (e.g., reduce carbon intensity in transportation fuels as compared to some baseline level related to conventional petroleum fuels) and/or produce a certain amount of biofuel (e.g., produce a mandated volume or a certain percentage of biofuels). The target GHG reductions and/or target biofuel amounts may be set per year or for a given target date. Some non-limiting examples of such initiatives, standards, and/or programs include the Renewable Fuel Standard Program (RFS2) in the United States, the Renewable Energy Directive (RED II) in Europe, the Fuel Quality Directive in Europe, the Renewable Transport Fuel Obligation (RTFO) in the United Kingdom, and/or the Low Carbon Fuel Standards (LCFS) in California, Oregon, or British Columbia). Credits can also be used to incentivize other products associated with reduced carbon or greenhouse gas emissions, such as for example, producer or production credits for clean hydrogen or credits for products made using clean hydrogen.

The term "credit", as used herein, refers to any rights or benefits relating to GHG or carbon reduction including but not limited to rights to credits, revenues, offsets, GHG gas rights, tax benefits, government payments or similar rights related or arising from emission reduction, trading, or any quantifiable benefits (including recognition, award or allocation of credits, allowances, permits or other tangible rights), whether created from or through a governmental authority, a private contract, or otherwise. A credit can be a certificate, record, serial number or guarantee, in any form, including electronic, which evidences production of a quantity of hydrogen or fuel meeting certain life cycle GHG emission reductions relative to a baseline (e.g., a gasoline baseline) set by a government authority. Credits for low CI hydrogen may be set by regulatory authority and provided in many forms, e.g., producer credits and the like. Non-limiting examples of fuel credits include RINs and LCFS credits. A Renewable Identification Number (or RIN), which is a certificate that acts as a tradable currency for managing compliance under the RFS2, may be generated for each gallon of biofuel (e.g., ethanol, biodiesel, etc.) produced. A Low Carbon Fuel Standard (LCFS) credit, which is a certificate which acts as a tradable currency for managing compliance under California's LCFS, may be generated for each metric ton (MT) of $CO_2$ reduced.

In general, the requirements for generating or causing the generation of credits can vary by country, the agency, and or the prevailing regulations in/under which the credit is generated. In many cases, credit generation may be dependent upon a compliance pathway (e.g., predetermined or applied for) and/or the biofuel meeting a predetermined GHG emission threshold. For example, with regard to the former, the RFS2 categorizes biofuel as cellulosic biofuel, advanced biofuel, renewable biofuel, and biomass-based diesel. With regard to the latter, to be a renewable biofuel under the RFS2, corn ethanol should have lifecycle GHG emissions at least 20% lower than an energy-equivalent quantity of gasoline (e.g., 20% lower than the 2005 EPA average gasoline baseline of 93.08 $gCO_2eq/MJ$). In low carbon-related fuel standards, biofuels may be credited according to the carbon reductions of their pathway. For example, under California's LCFS, each biofuel is given a carbon intensity score indicating their GHG emissions as grams of $CO_2$ equivalent per megajoule (MJ) of fuel, and credits are generated based on a comparison of their emissions reductions to a target or standard that may decrease each year (e.g., in 2019, ethanol was compared to the gasoline average carbon intensity of 93.23 $gCO_2eq/MJ$), where lower carbon intensities generate proportionally more credits.

In certain embodiments of the disclosure, the process includes monitoring inputs and/or outputs from each of the biomethane production, hydrogen production, and/or CCS. In this case, each of the inputs is a material input or energy input and each of the outputs is a material output or an energy output. Monitoring inputs and/or outputs of these process may facilitate calculating and/or verifying GHG emissions of the process, calculating and/or verifying carbon intensity of the fuel, fuel intermediate, or chemical product, may facilitate credit generation (e.g., based on volumes of fuel produced), and/or may facilitate determining renewable content (e.g., when co-processing renewable and non-renewable fuels). Monitoring can be conducted over any time period (e.g., monthly statements, etc.). Monitoring can be conducted in conjunction with and/or using any suitable technology or combination of technologies that enables measurement of material and/or energy flows.

Meeting a Target CI and/or Clean Hydrogen Standards

In certain embodiments of the disclosure, the process includes producing hydrogen that is treated as clean hydrogen under applicable regulations (e.g., produced in compliance with a greenhouse gas emissions standard established by government). In general, clean hydrogen, which is produced with relatively low GHG emissions (e.g., low relative to GHG emissions associated with the steam methane reforming of non-renewable natural gas), may be produced using low-carbon power (e.g., via electrolysis using renewable power), from fossil fuels (e.g., via the steam methane reforming of non-renewable natural gas where carbon dioxide generated during hydrogen production is provided for CCS), and/or from renewable feedstocks (e.g., via the steam methane reforming of biomethane feedstock). Whether such hydrogen and/or its production qualifies as clean hydrogen under applicable regulations and/or qualifies for one or more credits can depend on the applicable regulations (e.g., on the clean hydrogen standards). In one approach to determining whether hydrogen qualifies as clean hydrogen, the GHG emissions of hydrogen production are compared to some lifecycle GHG emission threshold as a percent savings relative to a fossil comparator. For example, in one approach clean hydrogen could require an at least 60% GHG savings versus a natural gas SMR benchmark of 91 $gCO2e/MJ$ (LHV). In general, the CI of such fossil comparators can depend on the applicable regulations. For purposes herein, a "fossil comparator" for hydrogen production has a CI of about 102 $gCO_2e/MJ$ $H_2$ (LHV), unless stated otherwise.

EXAMPLES

Example 1: Meeting a Targeted CI in an Oil Refinery

The following example demonstrates how hydrogen can be produced in a hydrogen production facility within an oil refinery that meets a targeted carbon intensity ($CI_T$). Advantageously, the target CI can correspond to a GHG reduction that is as high as a 95% relative to a baseline as defined herein. The method comprises replacing, at the hydrogen production facility, a fraction of the non-renewable gaseous feedstock, in this example natural gas, with a biomethane feedstock having a low CI value, such as between 15 g $CO_2eq/MJ$ and −500 g $CO_2eq/MJ$. The non-renewable gaseous feedstock replaced is either feedstock fed to methane reforming and/or feedstock used to generate heat for the reforming in the hydrogen production.

The fraction of the natural gas feedstock to be replaced is represented by r and is determined by Equation A set forth below. The calculated r value enables a hydrogen producer to easily select a defined fraction of natural gas to be replaced with the biomethane feedstock to achieve a target CI or a target GHG emissions reduction set by legislators. This in turn enables a hydrogen producer or other entity to obtain valuable credits and thereby incentivizes hydrogen production having a low target CI value.

The fraction r takes into consideration the CI of the biomethane feedstock. In this non-limiting example, in order to ensure that the amount of natural gas replaced at the hydrogen production facility is less than 50%, the CI of the biomethane feedstock is between 15 g $CO_2eq/MJ$ and −500 g $CO_2eq/MJ$ (determined using GREET).

By ensuring the CI of the biomethane falls within this low CI range, less than half of the natural gas used in reforming, and/or that replaces the heat to fuel the reforming, is most desirably replaced with the biomethane. This saves cost as the oil refinery can continue to use feedstock obtained from established sources using existing infrastructure (e.g., natural gas from a pipeline), yet allows the greenhouse gas emissions of the hydrogen to be reduced to below a desired threshold value (e.g., meet the target CI). Advantageously, the target CI can be reached with the minimal amount of biomethane feedstock, which can be a relatively scarce resource (e.g., compared to fossil-based natural gas). The process may also act as a bridge between the use of conventional fossil fuels to greener alternatives, thereby easing the transition to greener alternatives in the future. In general, this approach can provide a cost-effective approach for reducing carbon intensity.

In this example, the targeted carbon intensity ($CI_T$) corresponds to a 95% GHG emissions reduction measured relative to a fossil baseline set by regulators as this achieves the greatest benefits to a hydrogen producer under proposed U.S. legislation in the form of credits. However, other target values can be achieved by replacing a defined quantity of natural gas with the low CI biomethane as defined by r.

With reference to FIG. 1A, an oil refinery 20 is shown that comprises a steam methane reforming unit, shown as SMR 30 that is located within a hydrogen production facility of the oil refinery 20. In this non-limiting example, the non-renewable gaseous feedstock fed to the SMR 30 is natural gas extracted from the earth from fossil sources by a well 2. The natural gas 5 after conventional processing is introduced to a pipeline and withdrawn at the oil refinery 20 and fed to the SMR 30 to produce hydrogen. In turn, the hydrogen is used in hydroprocessing operations to upgrade crude oil in the oil refinery 20.

A low CI biomethane feedstock 10 is sourced having a carbon intensity value (CI) value within a range that is between 15 g $CO_2$ eq/MJ and −500 g $CO_2$ eq/MJ. The low CI biomethane feedstock 10 may be obtained from an anaerobic digestion of an organic material, such as animal waste, followed by collection of methane and carbon dioxide and sequestration of the carbon dioxide underground. Further examples to obtain the low CI biomethane are described below.

At the oil refinery 20, a fraction r of the natural gas 5, shown by the equation, is replaced with the low CI biomethane feedstock 10 in the SMR 30. As mentioned, the fraction r of natural gas 5 replaced is less than 50%. By selecting an appropriate r, a low CI hydrogen 40 is produced that meets the targeted hydrogen CI. The determination of r using the equation is described in more detail in Example 2.

Figure 1B:
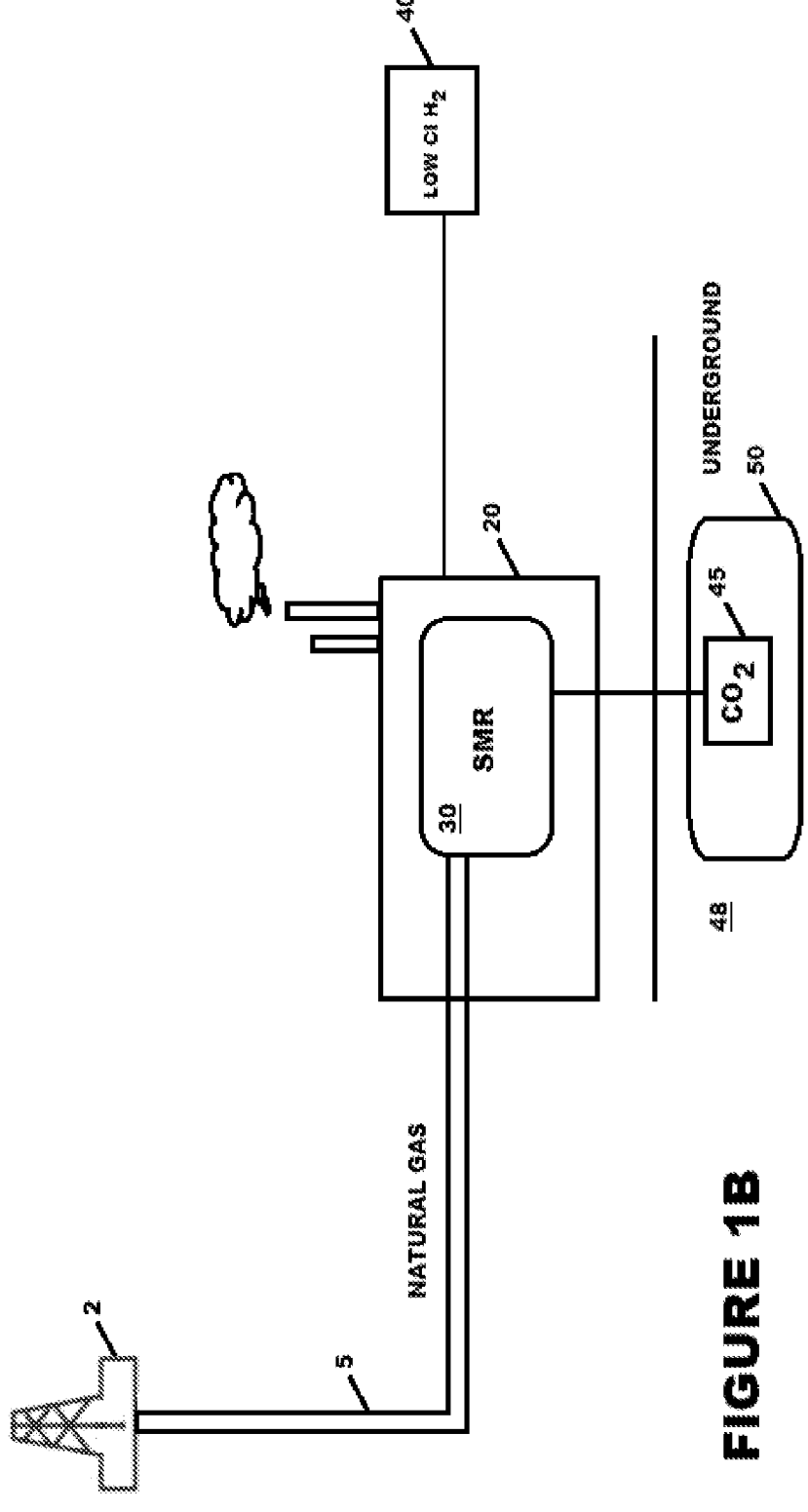
FIG. 1B describes a baseline process for producing hydrogen that is carried out without replacing a fraction r of natural gas with a biomethane feedstock in the SMR of an oil refinery.
Figure 1C:
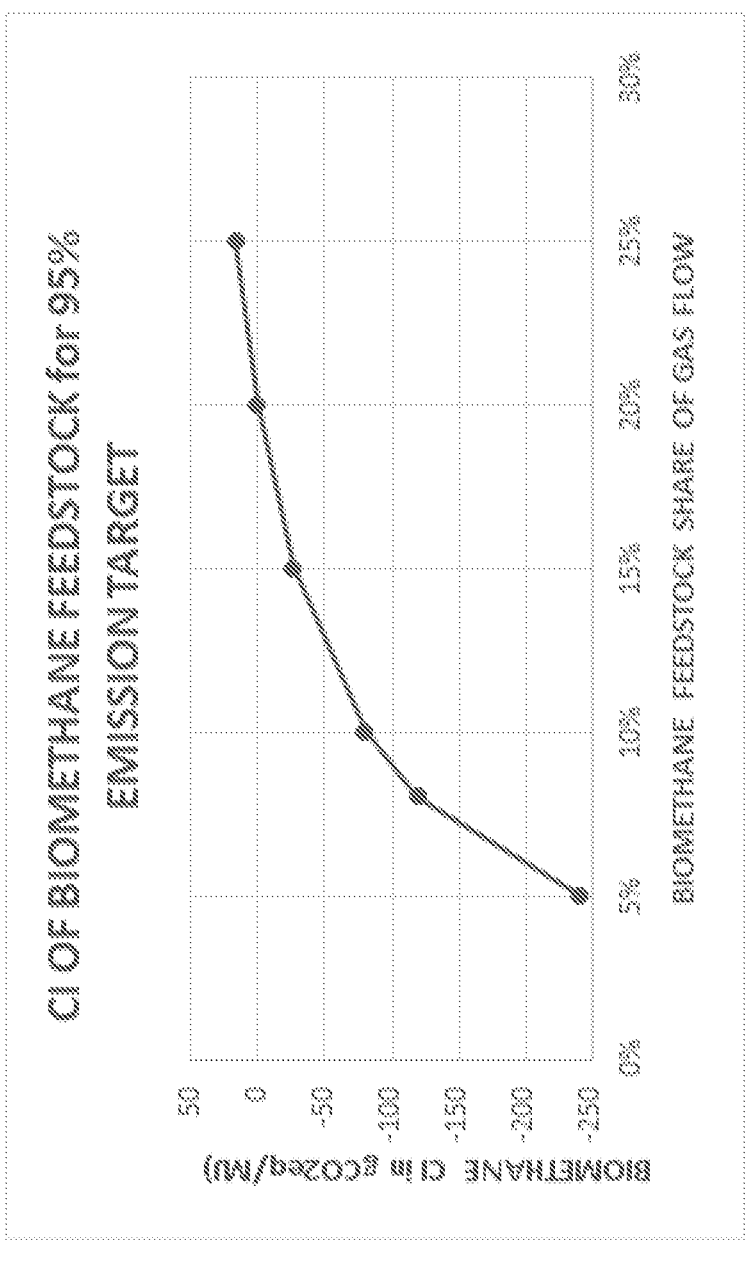
FIG. 1C is a graph showing biomethane feedstock CI in $gCO_2eq/MJ$ vs a biomethane feedstock share of gas flow in the SMR to achieve a 95% GHG reduction of the hydrogen relative to a baseline.

The graph 35 (shown to the right of the drawing) is a simplified drawing that depicts the CI of the low CI biomethane vs. the biomethane share of gas flow. Without being limiting, such graph 35 may be generated to determine the fraction of the low CI biomethane feedstock 10 that replaces the natural gas 5 as a function of its CI value to achieve a given targeted carbon intensity ($CI_T$) of the hydrogen. The graph 35 is shown for illustration only and is simplified in order to facilitate an understanding of certain advantageous features of the invention. FIG. 1C shows a similar graph generated using Equation A.

In this non-limiting example, the target $CI_T$ associated with the hydrogen corresponds to a 95% GHG reduction relative to a baseline set by regulators. As can be seen, the graph 35 depicts that the lower the CI of the biomethane feedstock 10, the lower the share of the biomethane feedstock 10 used to make up the gas flow of SMR 30 to achieve a targeted hydrogen ($CI_T$).

The biomethane feedstock 10 share of gas flow to achieve a targeted carbon intensity ($CI_T$) of the hydrogen as shown in the graph 35 may depend on the initial carbon intensity ($CI_i$) of the hydrogen produced at the oil refinery 20 using solely natural gas 5 as the feedstock to SMR 30. Optionally, carbon dioxide 45 produced as a byproduct during steam methane reforming 30 is sequestered underground 48 in a reservoir 50 to reduce GHG emissions. This reduces the carbon intensity of the hydrogen produced at the oil refinery 20 relative to $CI_i$, which in turn reduces the biomethane share of gas flow in SMR 30 used to achieve the targeted carbon intensity ($CI_T$) of the hydrogen. The equation to calculate r factors in this reference initial carbon intensity ($CI_i$) of the hydrogen, as discussed below, to arrive at an r value to achieve the targeted carbon intensity ($CI_T$) of the hydrogen.

Example 2: Determining the Fraction r of Biomethane Feedstock that Replaces Natural Gas As discussed in Example 1, the fraction r of low CI biomethane feedstock 10 that replaces the natural gas 5 in FIG. 1A is determined by the following equation: Equation A:

$$r = \frac{(CI_i - CI_T - k - C_r)}{(CI_{NRGF} - CI_B)} \cdot y,$$

wherein the CI values of Equation A are in g $CO_2$ eq/MJ.

Each of the variables of Equation A is described in more detail below with reference to the non-limiting example set forth in Example 1 above and depicted in FIG. 1A. The description below of each parameter of Equation A should not be construed as limiting to the invention in any way and is merely provided to illustrate certain advantageous embodiments of the invention. For example, Equation A is described with reference to an oil refinery but is equally applicable to a hydrogen production facility located in a fertilizer plant or a stand-alone hydrogen production facility.

The $CI_i$ is a calculated carbon intensity of the hydrogen 40 produced by the SMR 30 produced using only natural gas 5 (i.e., without replacement of the low CI biomethane feedstock 10). Such a process is depicted in FIG. 1B in which only natural gas 5 is used in SMR 30. (FIG. 1B is otherwise identical to FIG. 1A, in which like references number depict the same or similar streams or unit operations between the two figures). The $CI_i$ value does not account for any reductions in CI due to the carbon capture and sequestration, such as the introduction of $CO_2$ 45 (produced as a byproduct in SMR 30) in a reservoir 50 located underground 48 as depicted in FIG. 1B.

The $CI_T$ is the target carbon intensity of the low CI $H_2$ 40 to be produced in the hydrogen production facility. In FIG. 1A, the low CI $H_2$ 40 achieves a carbon intensity corresponding to a 95% emissions reduction relative to a baseline set by regulators as shown in graph 35.

The k of Equation A is the net amount of carbon dioxide 45 captured and sequestered per unit of hydrogen produced in g $CO_2$eq/MJ. As noted above, the carbon dioxide 45 is a byproduct of SMR 30 and can be introduced underground 48 in a reservoir 50. It will be noted that k is zero when no carbon dioxide 45 is captured and introduced underground 48 in a reservoir 50. In other words, Equation A factors in any emission reductions from carbon capture and sequestration of carbon dioxide produced during hydrogen production that are already implemented in an oil refinery 20 prior to the replacement of natural gas 5 with the low CI biomethane feedstock 10, such as depicted in FIG. 1B. (However, as would be appreciated by those of skill in the art, such sequestration could also be implemented after the replacement or during such replacement). The $C_r$ of Equation A is the carbon dioxide emissions reduction per unit of hydrogen produced in g $CO_2$eq/MJ attributable to using renewable power in or associated with hydrogen production.

The $CI_{NRGF}$ is the carbon intensity of the non-renewable gaseous feedstock (NRGF) fed to the hydrogen production facility. In FIG. 1A, the non-renewable gaseous feedstock is the natural gas 5 fed to the SMR 5.

The $CI_B$ is the carbon intensity of biomethane feedstock 10 fed to the hydrogen production facility. In FIG. 1A, the hydrogen production facility is located within the oil refinery 20.

The y of Equation A is a ratio of energy of the hydrogen produced in MJ to the sum of energy of the non-renewable gaseous feedstock in MJ and the biomethane feedstock provided in MJ, for a given time period (e.g., a type of energy yield). In FIG. 1A, this is the ratio of the energy of the hydrogen 40 produced to the sum of energy of the natural gas feedstock 5 and the biomethane feedstock 10.

FIG. 1C is a graph showing $CI_B$ in g $CO_2$ eq/MJ vs. the biomethane feedstock share of gas flow to achieve a $CI_T$ corresponding to a 95% emissions reduction relative to a baseline (e.g., set by a regulatory agency). In this example, it is assumed that k is 60 g $CO_2$ eq/MJ.

It will be understood that the carbon intensity (CI) for each variable of Equation A is determined using a method selected according to prevailing rules and regulations in an applicable jurisdiction relevant to desired credits and can be readily calculated by those of ordinary skill in the art using techniques established by relevant regulatory bodies.

Example 3: Producing a Low CI Biomethane Feedstock

As noted previously, the low CI biomethane feedstock provided to the hydrogen production facility is prepared so that it has a CI value within a range that is between 15 g $CO_2$eq/MJ and −500 g $CO_2$eq/MJ. The CI value is obtained by at least one of:

(a) capturing and sequestering carbon dioxide generated from an anaerobic digestion or gasification that formed the biomethane feedstock;

(b) capturing and sequestering carbon from a residue of the anaerobic digestion or gasification that formed the biomethane feedstock;

(c) using a renewable energy source to power a production process for producing the biomethane feedstock; and/or (d) processing animal waste and avoiding emissions of methane to atmosphere that would otherwise have been released without production and collection of the biomethane feedstock.

Non-limiting examples of steps (a)-(d) above are illustrated in FIG. 2A-2D, respectively, below. In FIGS. 2A-2D, like reference numbers depict the same or similar unit operations or process streams.

Figure 2A:
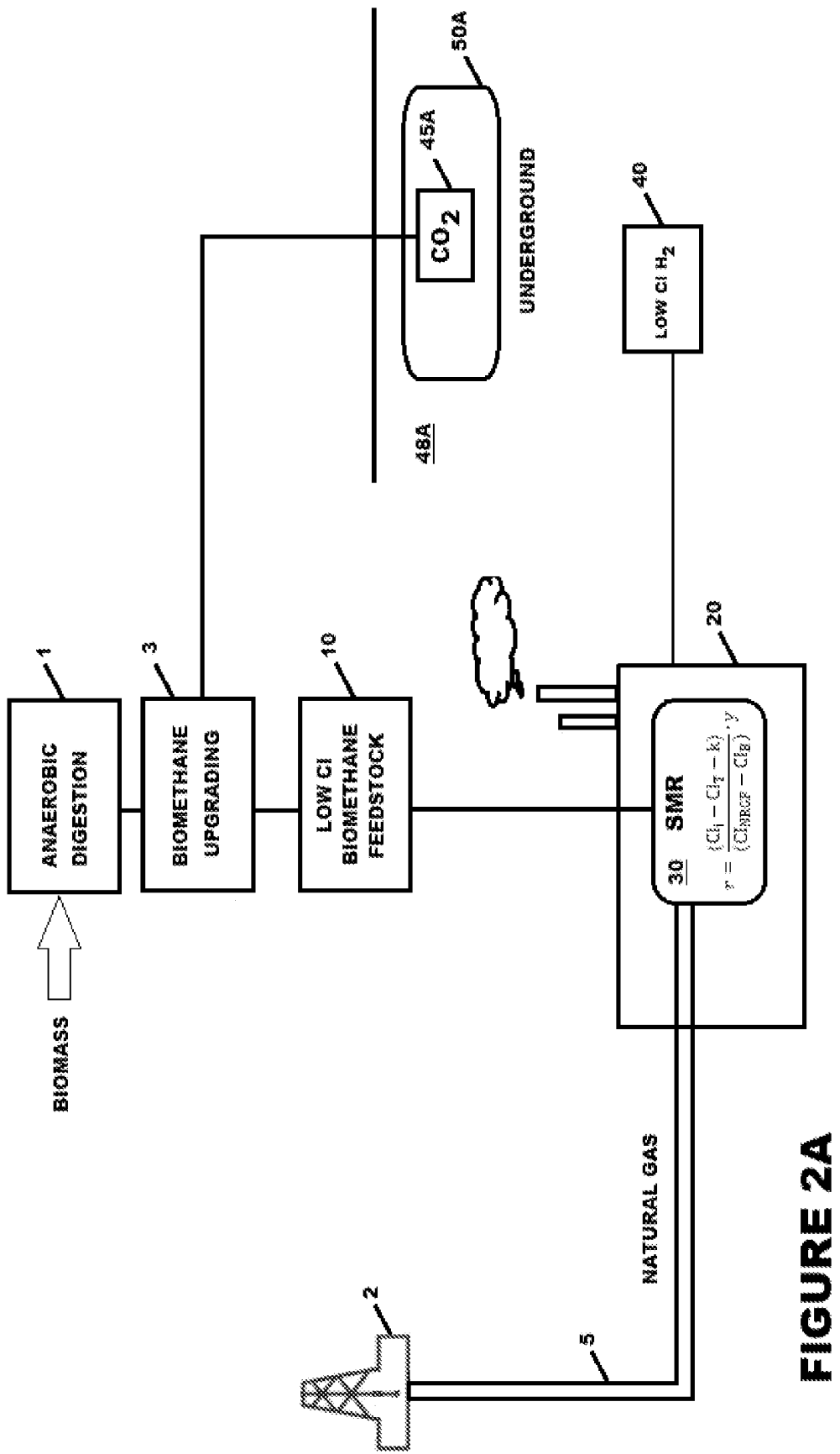
FIG. 2A shows an embodiment of the process in which carbon dioxide collected from biomethane upgrading is sequestered underground to produce a low CI biomethane feedstock for use in replacing a fraction of natural gas in the SMR.

With reference to FIG. 2A, biomass is sent to anaerobic digestion 1 in which the biomass is digested to produce biogas that is a gas mixture comprising methane ($CH_4$) and carbon dioxide ($CO_2$), and that typically additionally comprises water ($H_2O$), nitrogen ($N_2$), hydrogen sulfide ($H_2S$), ammonia ($NH_3$), oxygen ($O_2$), volatile organic compounds (VOCs), and/or siloxanes, depending on the biomass from which it is produced. The biogas is upgraded in biogas upgrading 3 to remove the carbon dioxide ($CO_2$) 45A and the additional unwanted components. The carbon dioxide 45A is introduced underground 48A in a reservoir 50A (after optional processing that includes purification). The resultant low CI biomethane feedstock 10 having a CI that is between 15 g $CO_2$eq/MJ and −500 g $CO_2$eq/MJ is sent to the SMR 30 in an oil refinery 20 as described previously with reference to FIG. 1A. As discussed, the SMR 30 can be part of a hydrogen production facility in an ammonia or fertilizer plant or a stand-alone facility to produce hydrogen for direct use as a fuel or as industrial feedstock (e.g., to upgrade other fuels).

Figure 2B:
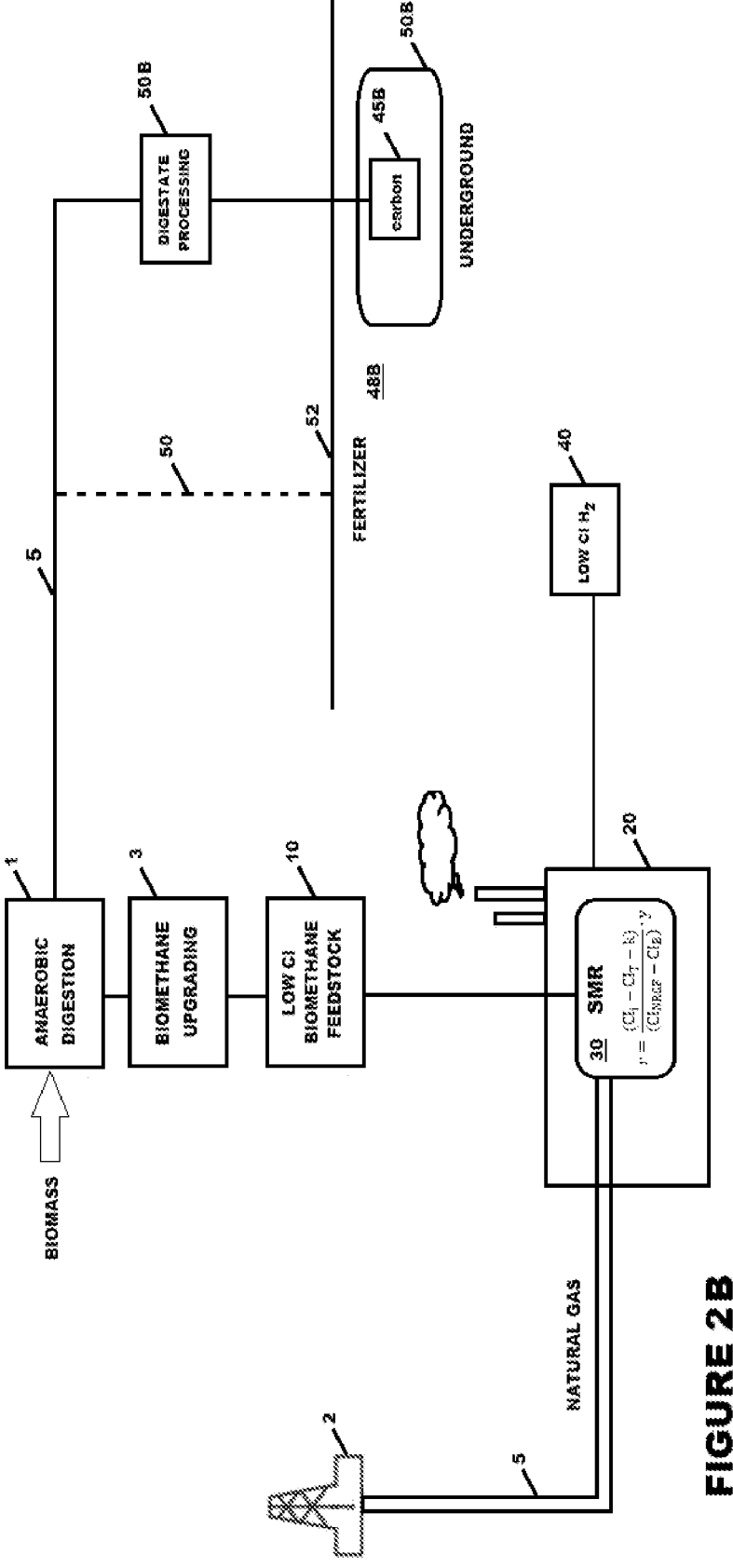
FIG. 2B shows an embodiment of the process in which a solid residue from anaerobic digestion in the form of a digestate is processed and sequestered underground or optionally used as fertilizer to produce a low CI biomethane feedstock for use in replacing a fraction of natural gas in the SMR.
Figure 2C:
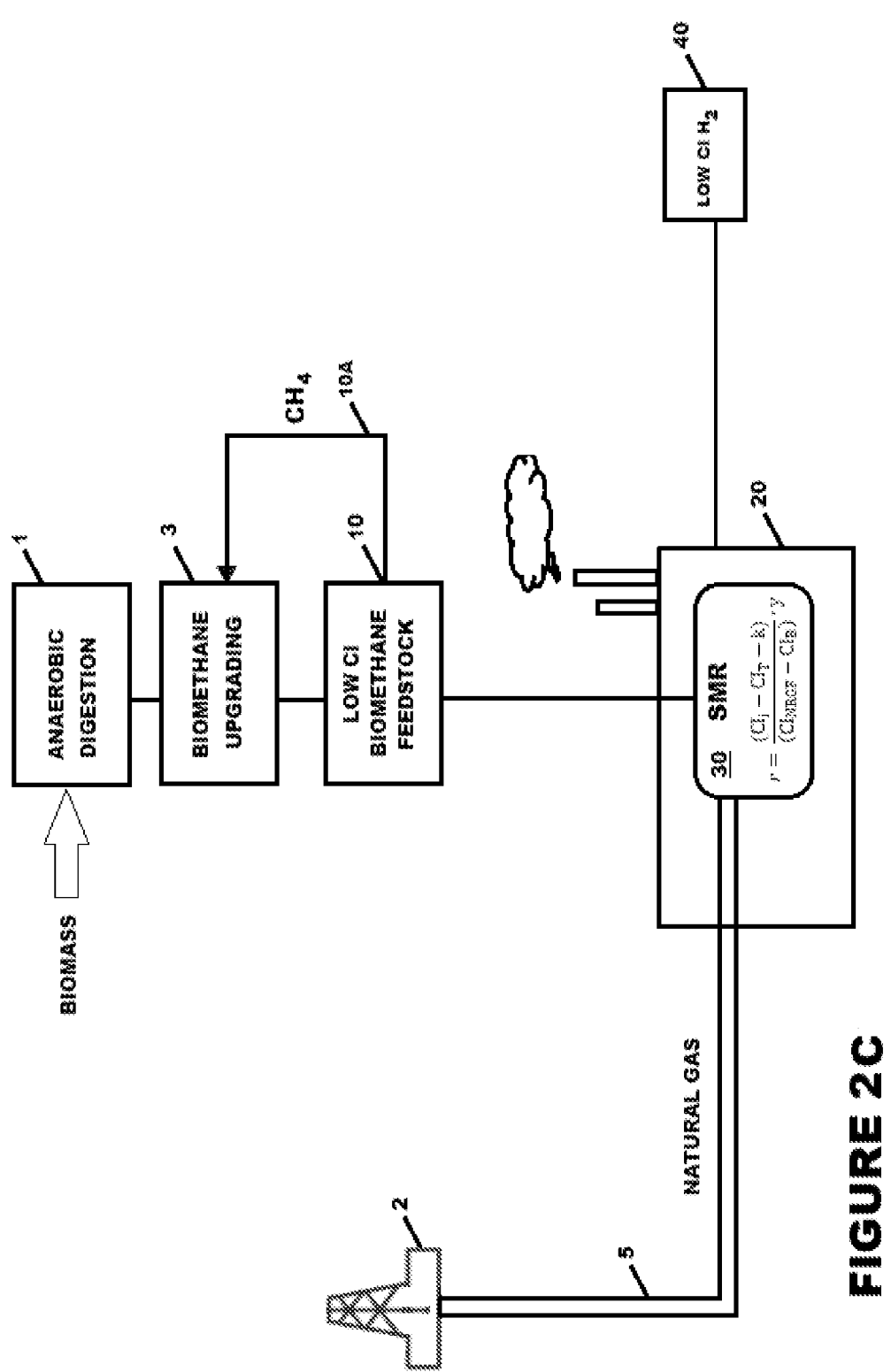
FIG. 2C shows an embodiment of the process in which a stream of low CI biomethane is used in a step of biomethane production that comprises biomethane upgrading to produce a low CI biomethane feedstock for use in replacing a fraction of natural gas in the SMR.

FIG. 2B likewise depicts biomass that is sent to anaerobic digestion 1 in which it is digested to produce biogas comprising methane ($CH_4$) and carbon dioxide ($CO_2$), among other components, such as those described previously, and a digestate 5. Digestate 5 can include organic material not digested by the anaerobic microorganisms, byproducts of the anaerobic digestion released by the microorganisms, and/or the microorganisms themselves. For example, the digestate 5 can include carbohydrates, nutrients (such as nitrogen compounds and phosphates), other organics, and/or wild yeasts. At least part of the digestate 5 may be used as a fertilizer 52 (e.g., soil conditioner), where it can provide nutrients for plant growth and/or displace the use of fossil-based fertilizers. However, digestate 5 used as a fertilizer 52 may have a significant methane formation potential, and thus may be associated with GHG emissions. In certain embodiments of the disclosure, the digestate 5 is processed in digestate processing 50B to provide carbon-containing material 45B that that can be sequestered underground 48B in a reservoir 50B.

The biogas is upgraded in biogas upgrading 3 to remove the carbon dioxide ($CO_2$) 45A and the additional components. The low CI biomethane feedstock that is designated as having a CI between 15 g $CO_2$eq/MJ and −500 g $CO_2$eq/MJ (determined by the GREET Model) is sent to the SMR 30 in an oil refinery 20 as described previously with reference to FIG. 1A.

With reference to FIG. 2C, biomass is sent to anaerobic digestion 1 in which the biomass 1 is digested to produce biogas comprising methane ($CH_4$) and carbon dioxide ($CO_2$), and that typically additionally comprises water ($H_2O$), nitrogen ($N_2$), hydrogen sulfide ($H_2S$), ammonia ($NH_3$), oxygen ($O_2$), volatile organic compounds (VOCs), and/or siloxanes, depending on the biomass from which it is produced. The biogas is upgraded in biogas upgrading 3 to remove the carbon dioxide ($CO_2$) 45A and the additional components. The low CI biomethane feedstock 10 having a CI that is between 15 g $CO_2$eq/MJ and −500 g $CO_2$eq/MJ is sent to the SMR 30 in an oil refinery 20 as described previously with reference to FIG. 1A. In addition, a portion 10A of the low CI biomethane feedstock 10 is recycled to biogas upgrading to fuel the biogas upgrading 3 operation. In another embodiment, the renewable energy source to at least partially power the production process is nuclear, renewable electricity or solar/wind. Using such a renewable energy source to power a production process for producing or upgrading the biogas may reduce the CI of the low CI biomethane feedstock 10.

Figure 2D:
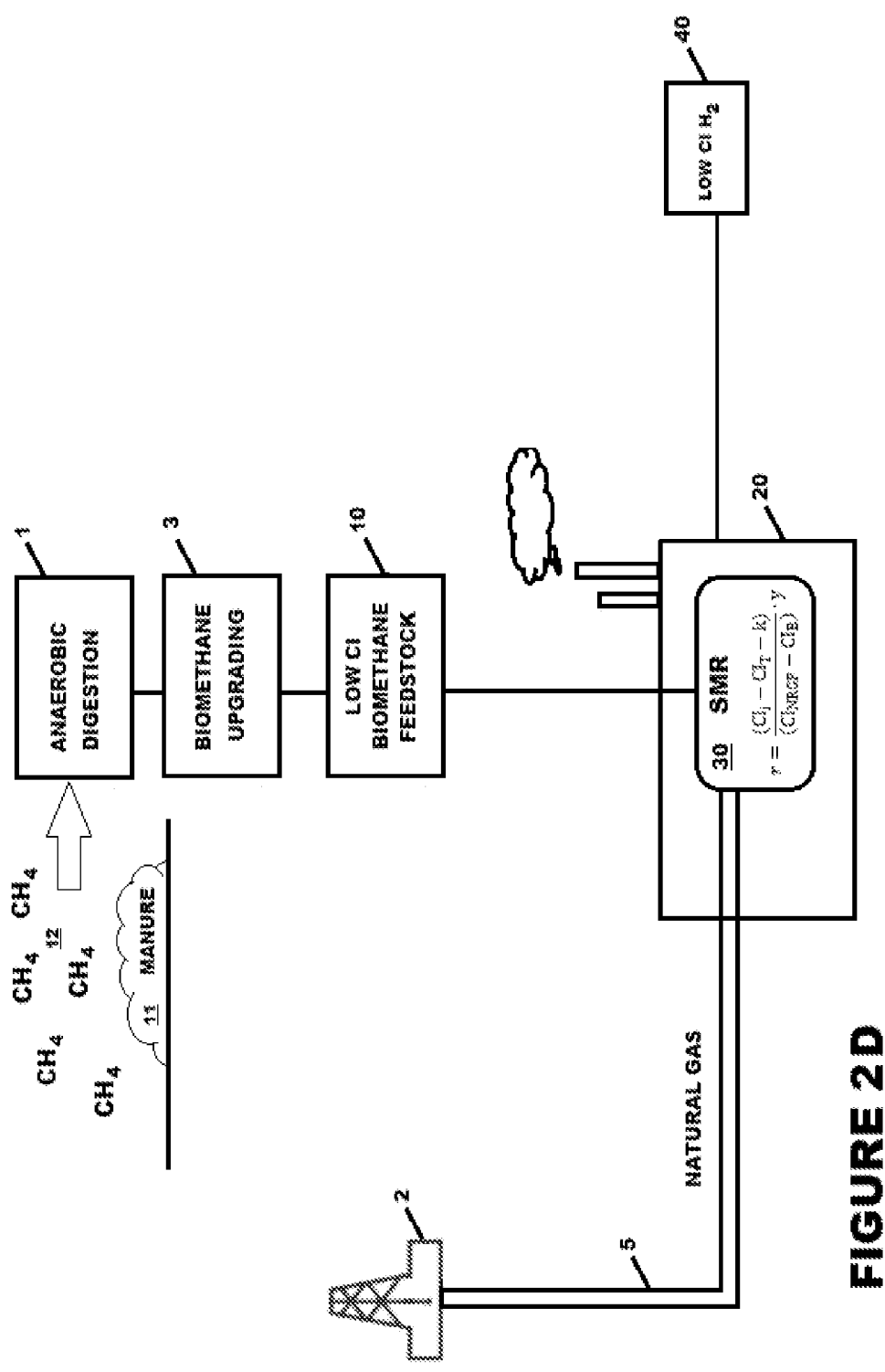
FIG. 2D shows an embodiment of the process in which a stream of low CI biomethane is used in a step of biomethane production that comprises collecting methane from an animal waste, thereby avoiding methane emissions that would otherwise be released to the atmosphere.

FIG. 2D shows biomass that is manure 11 from a dairy operation. The manure 11 generates methane 12 that is captured in an anaerobic digestion 1. In many farming operations, methane is not captured. The CI of the biomethane feedstock 10 is reduced by avoiding methane 12 emissions that would otherwise be released into the atmosphere. The gas mixture comprising methane is upgraded in 3 to remove the carbon dioxide ($CO_2$) 45A and the additional components as described with reference to previous figures. The low CI biomethane feedstock 10 having a CI that is between 15 g $CO_2$eq/MJ and −500 g $CO_2$eq/MJ is sent to the SMR 30 in an oil refinery 20 as described.

In order to obtain a desired CI value, one or any combinations of steps (a)-(d) can be used in the practice of embodiments herein.

The above embodiments have been provided as examples only. It will be appreciated by those of ordinary skill in the art that various modifications, alternate configurations, and/or equivalents will be employed without departing from the scope of the invention. Accordingly, the scope of the invention is therefore intended to be limited solely by the scope of the appended claims.

The invention claimed is:

1. A process of producing hydrogen that meets a target carbon intensity ($CI_T$), the process comprising:

at a facility that produces hydrogen by reforming non-renewable gaseous feedstock, replacing a fraction of the non-renewable gaseous feedstock with biomethane feedstock and obtaining hydrogen that meets the $CI_T$, wherein the non-renewable gaseous feedstock that is replaced is (a) feedstock fed to methane reforming, (b) feedstock used to generate heat for the reforming, or (c) a combination of (a) and (b), wherein the $CI_T$ reflects a lifecycle greenhouse gas (GHG) emissions reduction that is at least 70% relative to when the hydrogen is produced using only the non-renewable gaseous feedstock, wherein the biomethane feedstock has a carbon intensity (CI) value within a range that is between 15 g $CO_2$eq/MJ and −500 g $CO_2$eq/MJ, said CI value obtained at least in part by one or any combination of:

(a) capturing and sequestering carbon dioxide generated from an anaerobic digestion or gasification that formed the biomethane feedstock;

(b) capturing and sequestering carbon from residue of the anaerobic digestion or gasification that formed the biomethane feedstock;

(c) using a renewable energy source to at least partially power a production process for producing the biomethane feedstock; and (d) processing waste and avoiding emissions of methane to atmosphere that would otherwise have been released without production and collection of the biomethane feedstock, and wherein the fraction of the non-renewable gaseous feedstock that is replaced by the biomethane feedstock is (i) less than 50% and (ii) at least r, where r is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g $CO_2$eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the facility, k=net amount of carbon dioxide captured and sequestered per unit of hydrogen produced in g $CO_2$eq/MJ associated with hydrogen production, and wherein k is zero when no carbon dioxide is captured and sequestered, $C_r$=carbon dioxide emissions reduction per unit of hydrogen produced in g $CO_2$eq/MJ attributable to using renewable power in or associated with hydrogen production, $CI_{NRGF}$=the carbon intensity of the non-renewable gaseous feedstock (NRGF) fed to the facility, $CI_B$=carbon intensity of biomethane feedstock fed to the facility, and y=a ratio of energy of the hydrogen produced in MJ to the sum of energy of the non-renewable gaseous feedstock in MJ and energy of the biomethane feedstock in MJ.

2. The process of claim 1, wherein at least some carbon dioxide produced at the facility is provided for sequestration.

3. The process of claim 1, further comprising obtaining one or more credits for said hydrogen that meets the $CI_T$, for producing said hydrogen that meets the $CI_T$, or a combination thereof.

4. The process of claim 1, wherein the $CI_T$ reflects a lifecycle GHG reduction that is at least 75% relative to when the hydrogen is produced using only the non-renewable gaseous feedstock.

5. The process of claim 1, wherein the $CI_T$ reflects a lifecycle GHG reduction that is at least 80% relative to when the hydrogen is produced using only the non-renewable gaseous feedstock.

6. The process of claim 5, wherein the fraction of non-renewable gaseous feedstock replaced by the biomethane feedstock is less than 40%.

7. The process of claim 5, wherein the fraction of non-renewable gaseous feedstock replaced by the biomethane feedstock is less than 25%.

8. The process of claim 1, wherein the CI value of the biomethane feedstock is a negative value.

9. The process of claim 1, wherein the biomethane feedstock is formed from the anaerobic digestion, and wherein the value of the CI of the biomethane feedstock is due at least in part to the capturing and sequestering carbon dioxide generated from the anaerobic digestion.

10. The process of claim 8, wherein the negative value of the CI of the biomethane feedstock is due at least in part to at least two of:

a) capturing and sequestering of carbon dioxide generated from an anaerobic digestion or gasification that formed the biomethane feedstock;

b) capturing and sequestering carbon from residue of the anaerobic digestion or gasification that formed the biomethane feedstock;

c) using the renewable energy source to power a production process for producing or upgrading the biomethane feedstock; and d) processing waste and avoiding emissions of methane to atmosphere that would otherwise have been released without production and collection of the biomethane feedstock.

11. The process of claim 8, wherein the negative value of the CI of the biomethane feedstock is due at least in part to at least three of:

a) capturing and sequestering of carbon dioxide generated from an anaerobic digestion or gasification that formed the biomethane feedstock;

b) capturing and sequestering carbon from residue of the anaerobic digestion or gasification that formed the biomethane feedstock;

c) using the renewable energy source to power a production process for producing or upgrading the biomethane feedstock; and d) processing waste and avoiding emissions of methane to atmosphere that would otherwise have been released without production and collection of the biomethane feedstock.

12. The process of claim 8, wherein the CI value of the biomethane feedstock is between −25 g $CO_2$eq/MJ and −300 g $CO_2$eq/MJ.

13. The process of claim 8, wherein the CI value of the biomethane feedstock is between −50 g $CO_2$eq/MJ and −250 g $CO_2$eq/MJ.

14. The process of claim 8, wherein the CI value of the biomethane feedstock is between −75 g$CO_2$eq/MJ and −250 g $CO_2$eq/MJ.

15. The process of claim 1, wherein the biomethane feedstock is derived at least in part from biomass that is livestock manure, food scrap waste, or a combination thereof.

16. The process of claim 1, wherein said replacing comprises replacing the non-renewable gaseous feedstock fed to methane reforming with the biomethane feedstock.

17. The process of claim 1, wherein the non-renewable gaseous feedstock comprises natural gas, refinery gas, liquid petroleum gas (LPG), light naphtha, heavy naphtha and/or straight-run naphtha.

18. A process for producing hydrogen that meets a target carbon intensity ($CI_T$), the process comprising:

(i) introducing biomethane feedstock into a facility that produces the hydrogen by reforming, the biomethane feedstock having a carbon intensity (CI) value within a range that is between 15 g $CO_2$eq/MJ and −500 g $CO_2$eq/MJ;

(ii) replacing, at the facility, a fraction of the non-renewable gaseous feedstock with the biomethane feedstock, wherein the non-renewable gaseous feedstock replaced is (a) feedstock fed to methane reforming, (b) feedstock used to generate heat for the reforming in the hydrogen production, or c) a combination of a) and b), and wherein the fraction of the non-renewable gaseous feedstock replaced by the biomethane feedstock is less than 30%;

(iii) obtaining the $CI_T$ of the hydrogen by at least:
selecting an amount of the non-renewable gaseous feedstock to be replaced represented by r, wherein r is the fraction of the non-renewable gaseous feedstock replaced by the biomethane feedstock and wherein r is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g $CO_2$eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the facility, k=net amount of carbon dioxide captured and sequestered per unit of hydrogen produced in g $CO_2$eq/MJ associated with hydrogen production, and wherein k is zero when no carbon dioxide is captured and sequestered, $C_r$=carbon dioxide emissions reduction per unit of hydrogen produced in g $CO_2$eq/MJ attributable to using renewable power in or associated with hydrogen production, $CI_{NRGF}$=the carbon intensity of the non-renewable gaseous feedstock (NRGF) fed to the facility, $CI_B$=carbon intensity of biomethane feedstock fed to the facility, and y=a ratio of energy of the hydrogen produced in MJ to the sum of energy of the non-renewable gaseous feedstock in MJ and the energy of the biomethane feedstock in MJ; and (iv) obtaining the hydrogen that meets the $CI_T$, wherein the hydrogen so obtained has at least a 70% reduction in carbon emissions relative to the facility using only the non-renewable gaseous feedstock.

19. A process of producing hydrogen that meets a target carbon intensity ($CI_T$), the process comprising:

providing biomethane feedstock to a facility that produces hydrogen by reforming non-renewable gaseous feedstock, the biomethane feedstock having a CI value within a range that is between 15 g $CO_2$eq/MJ and −500 g $CO_2$eq/MJ, said CI value obtained at least in part by one or any combination of:

(a) capturing and sequestering carbon dioxide generated from an anaerobic digestion or gasification that formed the biomethane feedstock;

(b) capturing and sequestering carbon from a residue of the anaerobic digestion or gasification that formed the biomethane feedstock;

(c) using a renewable energy source to at least partially power a production process for producing the biomethane feedstock; and (d) processing waste and avoiding emissions of methane to atmosphere that would otherwise have been released without production and collection of the biomethane feedstock;

wherein the biomethane feedstock is provided in an amount selected to replace a fraction of the non-renewable gaseous feedstock with the biomethane feedstock and obtain the hydrogen that meets the $CI_T$, wherein the non-renewable gaseous feedstock replaced is (a) feedstock fed to methane reforming, (b) feedstock used to generate heat for the reforming, or (c) a combination of (a) and (b), wherein the fraction of the non-renewable gaseous feedstock replaced by the biomethane feedstock is less than 50%, and wherein the fraction of the non-renewable gaseous feedstock replaced by the biomethane feedstock is at least r, where r is determined by the following Equation A:

$$r = \frac{(CI_i - CI_T - k - C_r)}{(CI_{NRGF} - CI_B)} \cdot y \qquad \text{Equation A}$$

wherein the CI values $CI_i$, $CI_T$, $CI_{NRGF}$, and $CI_B$ of Equation A are expressed in g $CO_2$eq/MJ, $CI_i$=a carbon intensity of the hydrogen when it is assumed that the hydrogen is produced using only non-renewable gaseous feedstock and without accounting for any reductions in CI due to carbon capture and sequestration and without accounting for any reductions in CI due to the use of renewable power, $CI_T$=the target carbon intensity of the hydrogen to be produced in the facility, k=net amount of carbon dioxide captured and sequestered per unit of hydrogen produced in g $CO_2$eq/MJ associated with hydrogen production, and wherein k is zero when no carbon dioxide is captured and sequestered, $C_r$=carbon dioxide emissions reduction per unit of hydrogen produced in g $CO_2$eq/MJ attributable to using renewable power in or associated with hydrogen production, $CI_{NRGF}$=the carbon intensity of the non-renewable gaseous feedstock (NRGF) fed to the facility, $CI_B$=carbon intensity of biomethane feedstock fed to the facility, and y=a ratio of energy of the hydrogen produced in MJ to the sum of energy of the non-renewable gaseous feedstock in MJ and the biomethane feedstock in MJ; and wherein the hydrogen obtained that meets the $CI_T$ has at least a 70% reduction in carbon emissions relative to the hydrogen produced using only the non-renewable gaseous feedstock.

\* \* \* \* \*